United States Patent
Takano et al.

(10) Patent No.: US 6,842,616 B2
(45) Date of Patent: Jan. 11, 2005

(54) CELLULAR SYSTEM

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 461 days.

(21) Appl. No.: 10/096,833

(22) Filed: Mar. 14, 2002

(65) Prior Publication Data

US 2002/0132621 A1 Sep. 19, 2002

(30) Foreign Application Priority Data

Mar. 14, 2001 (JP) ........................................ 2001-071369

(51) Int. Cl.$^7$ .............................................. H04Q 7/20
(52) U.S. Cl. .............................. 455/435.2; 455/115.1; 455/115.3; 455/524; 455/525; 370/332; 370/333
(58) Field of Search .......................... 455/435.1, 435.2, 455/522, 524, 525, 161.3, 67.11, 67.13, 67.14, 115.1, 115.3; 370/328, 331, 332, 333

(56) References Cited

U.S. PATENT DOCUMENTS

| | | | | |
|---|---|---|---|---|
| 6,157,668 A | * | 12/2000 | Gilhousen et al. | 375/130 |
| 6,647,261 B1 | * | 11/2003 | Banerjee | 455/436 |
| 6,721,571 B2 | * | 4/2004 | Tran et al. | 455/453 |
| 2001/0022558 A1 | * | 9/2001 | Karr et al. | 342/450 |

FOREIGN PATENT DOCUMENTS

| | | |
|---|---|---|
| JP | 11-69416 A | 3/1999 |
| JP | 11-275624 A | 10/1999 |
| JP | 11-355204 A | 12/1999 |
| JP | 2000-138633 A | 5/2000 |
| JP | 2000-252917 A | 9/2000 |
| KR | 1999-006977 A | 1/1999 |
| KR | 1999-0044194 A | 6/1999 |
| WO | WO 97/50197 A1 | 12/1997 |

OTHER PUBLICATIONS

H. Furukawa, et al: "SSDT—Site Selection Diversity Transmission Power Control for CDMA Forward Link" IEEE Journal on Selected Areas in Communications, vol. 18, No. 8, Aug. 2000, pp. 1546–1554, XP002208400.

"TSG R1–01–0275 Enhancement of SSDT for Release 5" 3GPP TSG RAN Working Group 1 Meeting 19, Feb. 27, 2001–Mar. 2, 2001, XP002208402, Las Vegas, USA, pp. 1–4.

(List continued on next page.)

*Primary Examiner*—Congvan Tran
(74) *Attorney, Agent, or Firm*—Sughrue Mion, PLLC

(57) ABSTRACT

A cellular system includes a mobile station and base stations, wherein the mobile station establishes a communication line with N first base stations wherein N is an integer (1≦N), measures receipt quality in pilot signals transmitted from the N first base stations, determines M second base stations to make communication therethrough among the N first base stations, based on measurement results of the receipt quality, wherein M is an integer (1≦M≦N), and transmits an designation signal to the M second base stations through upward line to designate the M second base stations as a base station through which the mobile station makes communication, and each of the base stations makes communication with the mobile station, if designated by the designation signal, and does not make communication with the mobile station, if not designated. The cellular system further includes a first apparatus for varying a signal-receipt error rate in the designation signal to be transmitted through upward line in accordance with a target signal-receipt error rate in downward line.

74 Claims, 19 Drawing Sheets

OTHER PUBLICATIONS

Nahoko Takano et al., "Enhancement of Site Selection Diversity Transmit Power Control in CDMA Cellular Systems", *IEEE 0–7803–7005, Vehicular Technology Conference*, XP–002208399, vol. 2, Conf. 54, Aug. 2001, pp. 635–639.

Hiroshi Furukawa et al., "SSDT—Site Selection Diversity Transmission Power Control for CDMA Forward Link", *IEEE Journal on Selected Areas in Communications*, vol. 18, No. 8, Aug. 2000, pp. 1546–1554.

Kojiro Hamabe, "Adjustment Loop Transmit Power Control during Soft Handover in CDMA Cellular Systems", *IEEE VTC 2000*, XP–002208401, 2000, pp. 1519–1523.

"TSG R1–01–0275 Enhancement of SSDT for Release 5", TSG–RAN Working Group 1 meeting #19, XP–002208402, Feb. 27, 2001, pp. 1–4.

"Universal Mobile Telecommunications System (UMTS); Physical layer procedures (FDD) (3GPP TS 25.214 version 3.4.0 Release 1999)", ETSI TS 125 214 V3.4.0, XP–002166612, Sep. 2000, pp. 1–47.

Hiroshi Furukawa, "Site Selection Transmission Power Control in DS–CDMA Cellular Downlink", *Universal Personal Communications, 1998. ICUPC '98*. IEEE 1998 International Conference in Florence, Italy, Oct. 5–9, 1998, XP–010315068, pp. 987–991.

* cited by examiner

CELLULAR SYSTEM

BACKGROUND OF THE INVENTION

1. Field of the Invention

The invention relates to a cellular system and a method of controlling power at which a signal is transmitted in a cellular system, and more particularly to a cellular system and a method for controlling communication at a base station during hand-over.

2. Description of the Related Art

In a cellular system operating in direct sequence-code division multiple access (DS-CDMA), since a common frequency band is assigned to a plurality of channels, radio waves for the plurality of channels and radio waves for other channels would interfere with each other. If those radio waves much interfere with each other, receipt quality in a desired radio wave would be deteriorated, resulting in disconnection in communication lines. Hence, the number of lines through which communication can be made with desired receipt quality being maintained, that is, line capacity is dependent on how much radio waves interfere with other.

A signal transmitted from a first mobile station located remoter from a base station is attenuated more rapidly in upward line with respect to power than a signal transmitted from a second mobile station located closer to a desired base station. Accordingly, if the first and second mobile stations would transmit signals in the same power, an interference wave would be greater in power than a desired radio wave, causing far-to-near effect which is a bar to making communication. Accordingly, power at which mobile stations transmit signals has to be controlled in upward line in such a manner that a base station receives signals from the mobile stations by even power.

On the other hand, such far-to-near effect as mentioned above is not caused in downward line. However, power at which a base station transmits a radio signal to a mobile station is controlled also in downward line such that the power could ensure minimum receipt quality in radio signals received in a mobile station, in order to reduce interference with other channels. Power at which a base station transmits a radio sill to a mobile station is controlled in a closed-loop control wherein measured receipt quality in received radio signals is compared to a target quality, and if the measured receipt quality is higher than the target quality, a base station transmits a transmission power control (TPC) signal to a mobile station to instruct the mobile station to reduce power at which a mobile station transmits a radio signal to a base station, whereas if the measured receipt quality is lower than the target quality, a base station transmits TPC signal to a mobile station to instruct the mobile station to increase power at which a mobile station transmits a radio signal to a base station.

A cellular system operating in code division multiple access (CDMA) usually uses soft hand-over technique in which if a mobile station approaches a boundary between cells, and hence, a transmission loss between a signal transmitted from a base station with which the mobile station is making communication, and a signal transmitted from an adjacent base station becomes equal to or greater than a predetermined threshold, the base station and the adjacent base station are both connected to the mobile station, and both the base stations transmit radio signals to the mobile station.

The soft handover technique ensures a mobile station to have enhanced receipt quality by virtue of diversity effect brought by transmission from a plurality of base stations even in the vicinity of a boundary among cells where transmission lose is usually high, and hence, receipt quality is likely to be deteriorated. Specifically, before a line through which a mobile station is making communication with a base station is disconnected, a line through which the mobile station can make communication with a next candidate of a base station is ensured, ensuring smooth hand-over without a pause.

However, downward line is accompanied with a problem that since a plurality of base stations transmit radio signals during soft hand-over, radio signals would interference with one another with the result of reduction in line capacity.

In order to solve the above-mentioned problem, Japanese Unexamined Patent Publication 11-69416 A has suggested a cellular system in which only selected base stations are allowed to transmit radio signals among base stations which are in hand-over condition, to thereby reduce interference in radio signals in downward line. Specifically, a base station transmits a pilot signal at predetermined power, and a mobile station measures receipt quality in pilot signals transmitted from base stations with which the mobile station establishes a line. The mobile station determines a base station transmitting a pilot signal having high receipt quality, as a base station through which the mobile station makes communication (hereinafter, such a base station is referred to as "transmission base station"), multiplexes a signal for designating a base station as a base station through which the mobile station makes communication, to a control signal, and transmits the thus multiplexed signal to a base station or base stations in upward line.

A base station having established a line with a mobile station transmits a radio signal to the mobile station through downward line only when the mobile station designates the base station as the transmission base station by transmitting a control signal to the base station, and a base station or base stations which receive(s) a designation signal by which the base station or base stations is(are) not designated as a transmission base station does(do) not transmit a radio signal to the mobile station. Thus, it would be possible to make only a base station presenting small transmission loss to make communication with a mobile station, ensuring reduction in interference in downward line and an increase in line capacity.

However, the above-mentioned conventional method of controlling power at which a radio signal is transmitted is accompanied with a problem that a base station might wrongly receive a designation signal by which the base station is designated as a transmission base station. In particular, if a transmission base station wrongly receives a designation signal by which the transmission base station is not designated, and hence, stops transmitting radio signals, all of he base stations having established a line with the mobile station might not transmit radio signals to the mobile station.

If such a case occurs, since a radio signal is not transmitted at all throughout an updating period in the transmission base station, it would not be possible to accomplish normal demodulation even by interleave or error correction in a mobile station. This increases possibility of receipt error, and hence, increases an error rate in a mobile station.

Accordingly, a signal-signal-receipt error rate which can be accomplished in downward line is restricted by a signal-signal-receipt error rate of a control signal in upward line. Hence, if a requested target signal-signal-receipt error rate is quite low, it might not be possible to accomplish such a low target signal-signal-receipt error rate.

In order to solve such a problem, it would be necessary to minimize a rate at which a transmission base station does not transmit radio signals at all. To this end, it would be necessary to render a signal-signal-receipt error rate of a control signal in a transmission base station as small as possible, for instance, by providing high power for transmitting a control signal by which a base station is designated as a transmission base station, or by providing a control signal with high redundancy.

However, the above-mentioned solution would cause another problem of reduction in a line capacity in upward line and a longer period for updating a transmission base station.

As one of solutions to the above-mentioned problem, a plurality of base stations may be kept selected as a transmission base station. In the solution, even if signal-receipt error occurs in one of the transmission base stations, a possibility of stopping transmitting radio signals in all base stations can be rendered small by carrying out transmission of radio signals in other transmission base stations.

However, this solution would cause another problem that interference in radio signals transmitted from a plurality of base stations is increased, and hence, a line capacity in downward line is reduced.

Japanese Unexamined Patent Publication No. 11-275624 A has suggested a mobile communication system in which at least one base station having transmission loss equal to or smaller than a predetermined threshold among base stations which are in soft hand-over condition with a mobile station is selected as a communication base station for making communication with the mobile station, and power at which base stations other than the selected communication base station transmits a radio signal is uniformly attenuated to a predetermined minimum power.

Japanese Unexamined Patent Publication No. 11-355204 A has suggested a CDMA mobile communication system including a plurality of base stations each of which is connected to a mobile terminal through radio line for making communication with the mobile terminal, and a base station controller which switches the base stations with which the mobile terminal makes communication, and controls power at which the mobile terminal transmits a radio signal. Each of the base stations includes first means for detecting signal-receipt quality of a signal transmitted from the mobile terminal, a first comparator which compares the signal-receipt quality detected by the first means to a predetermined threshold, second means for, when the signal-receipt quality is equal to or higher than the predetermined threshold, measuring a frame error rate higher than a first standard level in the signal-receipt quality, a second comparator which compares the frame error rate to a predetermined threshold, third means for determining target signal-receipt quality, based on the result of comparison carried out by the second comparator, a third comparator which compares the signal-receipt quality measured by the second means to the target signal-receipt quality determined by the third means, and fourth means for generating and transmitting a control signal for controlling power at which the mobile terminal transmits a radio signal, based on the result of comparison carried out by the third comparator.

Japanese Unexamined Patent Publication No. P2000-138633 A has suggested a method of controlling power at which a radio signal is transmitted, including the steps of comparing signal-receipt quality of a signal transmitted from an opposite station, controlling power at which the opposite station transmits a signal, based on the result of comparison, checking whether there is a frame error in the received signal, increasing a control target, if there is a frame error, and gradually decreasing a control target, if there is not a frame error.

Japanese Unexamined Patent Publication No. P2000-252917 A has suggested a method of controlling power at which a radio signal is transmitted, in a cellular system, including the steps of comparing SIR of a received signal in a receiver to a target SIR, and controlling power at which a transmitter transmits a signal, based on a difference between them and/or whether which is greater, characterized by the steps of detecting a frame error in a received signal, counting the number n(k) of frame errors in an immediately prior N(k) frame ($1 \leq k \leq K$) for every M(k) frames or each time a frame error occurs, and increasing or decreasing a target SIR in accordance with the frame error numbers n(1) to n(K) alone or in combination.

International Publication WO97/50197 (PCT/JP97/02215) has suggested an apparatus of controlling power at which a signal is transmitted, to be equipped in one of a base station and a mobile station both of which constitutes a mobile communication system, including first means for measuring SIR of a received signal, second means for comparing SIR measured by the first means to a predetermined target SIR, third means for transmitting data about signal transmission power to an opposite station, based on the result of comparison carried out by the second means, fourth means for receiving and demodulating the above-mentioned data transmitted from the opposite station, fifth means for controlling power at which a signal is transmitted, based on the demodulated data, sixth means for measuring an error rate in received signal, and seventh means for varying the target SIR in accordance with the error rate measured by the sixth means.

However, the above-mentioned problem remains unsolved even in the above-mentioned Publications.

SUMMARY OF THE INVENTION

In view of the above-mentioned problems in the conventional cellular system or method of controlling power at which a radio signal is transmitted, it is an object of the present invention to provide a cellular system which minimizes influence to be exerted on a line capacity in upward or downward line, and an increase in a period for updating a transmission base station, and accomplishes a target signal-signal-receipt error rate in downward line.

It is also an object of the present invention to provide a base station controller and a mobile station both of which can do the same as mentioned above.

It is also an object of the present invention to provide a method of controlling power at which a signal is transmitted in a cellular system which method can does the same as mentioned above.

In one aspect of the present invention, there is provided a cellular system including at least one mobile station and a plurality of base stations, wherein the mobile station establishes a communication line with N first base stations wherein N is an integer equal to or greater than one ($1 \leq N$), measures receipt quality in pilot signals transmitted from the N first base stations, determines M second base stations to make communication therethrough among the N first base stations, based on measurement results of the receipt quality, wherein M is an integer equal to or greater than one, but equal to or smaller than N($1 \leq M \leq N$), and transmits an designation signal to the M second base stations through upward line to designate the M second base stations as a base station through which the mobile station makes communication, and each of the base stations makes communication with the mobile station, if designated by the designation signal as a base station through which the mobile station makes communication, and does not make communication with the mobile station, if not designated by the designation signal, the cellular system further includes a first apparatus for varying a signal-signal-receipt error rate in the designation signal to be transmitted through upward line in accordance with a target signal-signal-receipt error rate in downward line.

For instance, the first apparatus may determine a transmission ratio for transmitting the designation signal, in accordance with the target signal-signal-receipt error rate in downward line, to control the signal-signal-receipt error rate in the designation signal in the base stations making communication with the mobile station.

It is preferable that the cellular system further includes a base station controller which controls the base stations making communication with the mobile station, and wherein the base station controller includes the first apparatus therein.

Each of the base stations may include first the apparatus.

It is preferable that the cellular system further includes a base station controller which controls the base stations making communication with the mobile station, wherein the first apparatus is constituted as an apparatus which determines the target signal interference ratio in the upward line in the base stations in accordance with the target signal-signal-receipt error rate in the downward line, while a power at which the mobile station transmits a signal is controlled in a closed-loop such that receipt quality in the upward line reaches a target signal interference ratio.

It is preferable that the cellular system further includes a base station controller which controls the base stations making communication with the mobile station, wherein the first apparatus is constituted as an apparatus which determines a higher target signal interference ratio in the upward line for a lower target signal-signal-receipt error rate in the downward line.

It is preferable that the cellular system further includes a base station controller which controls the base stations making communication with the mobile station, wherein the first apparatus is constituted as an apparatus which determines a power at which the mobile station transmits the designation signal, in accordance with a target signal-signal-receipt error rate in the downward line.

It is preferable that the cellular system further includes a base station controller which controls the base stations making communication with the mobile station, wherein the fist apparatus is constituted as an apparatus which, when the mobile station transmits both a control signal to which the designation signal is multiplexed and an information signal to the base stations, determines a higher ratio of the control signal to the information signal with respect to a power at which the mobile station transmits the control and information signals, for a smaller target receipt rate in the downward line.

For instance, the first apparatus may be constituted as an apparatus which determines a power at which the mobile station transmits the designation signal, in accordance with a target signal-signal-receipt error rate in the downward line.

For instance, the first apparatus may be constituted as an apparatus which, when the mobile station transmits both a control signal to which the designation signal is multiplexed and an information signal to the base stations, determines a higher ratio of the information signal to the control signal with respect to a power at which the mobile station transmits the information and control signals, for a smaller target receipt rate in the downward line.

It is preferable that the cellular system further includes a base station controller which controls the base stations making communication with the mobile station, wherein the first apparatus is constituted as an apparatus which determines a signal length of the designation signal in accordance with a target signal-signal-receipt error rate in the downward line.

It is preferable that the cellular system further includes a base station controller which controls the base stations making communication with the mobile station, wherein the first apparatus is constituted as an apparatus which determines higher redundancy of the designation signal for a smaller target signal-signal-receipt error rate in the downward line, if the designation signal is encoded for correcting errors.

It is preferable that the cellular system further includes a base station controller which controls the base stations making communication with the mobile station, wherein the first apparatus is constituted as an apparatus which determines a longer signal interval between the designation signal and a next designation signal for a smaller target signal-signal-receipt error rate in the downward line, when the designation signal is designed to have a fixed number in bits per a unit time.

It is preferable that the cellular system further includes a base station controller which controls the base stations making communication with the mobile station, wherein the first apparatus is constituted as an apparatus which determines a higher number in bits per a unit time in the designation signal for a smaller target signal-signal-receipt error rate in the downward line, when the designation signal is designed to have a fixed transmission interval.

The first apparatus may be constituted as an apparatus which determines a signal length of the designation signal in accordance with the target signal-signal-receipt error rate in the downward line.

The first apparatus may be constituted as an apparatus which determines higher redundancy of the designation signal for a smaller target signal-signal-receipt error rate in the downward line, if the designation signal is encoded for correcting errors.

The first apparatus may be constituted as an apparatus which determines a longer interval between the designation signals for a smaller target signal-signal-receipt error rate in the downward line, when the designation signal is designed to have a fixed number of bits per a unit time.

The first apparatus may be constituted as an apparatus which determines a higher number in bits per a unit time in the designation signal for a smaller target signal-signal-receipt error rate in the downward line, when the designation signal is designed to have a fixed transmission interval.

There is further provided a cellular system including at least one mobile station and a plurality of base stations, wherein the mobile station establishes a communication line with N first base stations wherein N is an integer equal to or greater than one ($1 \leq N$), measures receipt quality in pilot signals transmitted from the N first base stations, determines M second base stations to make communication therethrough among the N first base stations, based on measurement results of the receipt quality, wherein M is an integer equal to or greater than one, but equal to or smaller than N($1 \leq M \leq N$), and transmits an designation signal to the M second base stations through upward line to designate the M second base stations as a base station through which the mobile station makes communication, and each of the base stations makes communication with the mobile station, if designated by the designation signal as a base station through which the mobile station makes communication, and does not make communication with the mobile station, if not designated by the designation signal, the cellular system further includes a first apparatus for varying conditions to determine the second base stations, in accordance with a target signal-signal-receipt error rate in downward line, to control the second base stations in number.

It is preferable that the cellular system further includes a base station controller which controls the base stations making communication with the mobile station, wherein the base station controller includes the first apparatus therein.

It is preferable that the first apparatus is constituted as an apparatus which controls the base stations making communication with the mobile station, wherein the base station controller includes a seventeenth apparatus which, when the mobile station designates a base station which transmits the pilot signal having receipt quality equal to or higher than a predetermined threshold, as the second base station, determines a higher threshold for a smaller target signal-signal-receipt error rate in the downward line.

It is preferable that the first apparatus is constituted as an apparatus which controls the base stations making communication with the mobile station, wherein the base station controller includes an eighteenth apparatus which determines a higher number of the second base stations for a smaller target signal-signal-receipt error rate in the downward line, when the mobile station designates a base station as the second base station by a predetermined number in the order of highness in the receipt quality of the pilot signal.

It is preferable that the first apparatus is constituted as an apparatus which controls the base stations making communication with the mobile station, wherein the base station controller includes a nineteenth apparatus which determines all of the base stations as the second base station, if the target signal-signal-receipt error rate in the downward line is equal to or smaller than a predetermined error rate.

The first apparatus may be constituted as an apparatus which, when the mobile station designates a base station which transmits the pilot signal having receipt quality equal to or higher than a predetermined threshold, as the second base station, determines a higher threshold for a smaller target signal-signal-receipt error rate in the downward line.

The first apparatus may be constituted as an apparatus which determines a higher number of the second base stations for a smaller target signal-signal-receipt error rate in the downward line, when the mobile station designates a base station as the second base station by a predetermined number in the order of highness in the receipt quality of the pilot signal.

The fist apparatus may be constituted as an apparatus which determines, all of the base stations as the second base station, if the target signal-signal-receipt error rate in the downward lie is equal to or smaller than a predetermined error rate.

In another aspect of the present invention, there is provided a base station controller for controlling a mobile station and a base station in a cellular system, wherein the mobile station establishes a communication line with N first base stations wherein N is an integer equal to or greater than one ($1 \leq N$), measures receipt quality in pilot signals transmitted from the N first base stations, determines M second base stations to make communication therethrough among the N first base stations, based on measurement results of the receipt quality, wherein M is an integer equal to or greater than one, but equal to or smaller than $N(1 \leq M \leq N)$, and transmits an designation signal to the M second base stations through upward line to designate the M second base stations as a base station through which the mobile station makes communication, and each of the base stations makes communication with the mobile station, if designated by the designation signal as a base station through which the mobile station makes communication, and does not make communication with the mobile station, if not designated by the designation signal, the base station controller includes a first apparatus for varying a signal-signal-receipt error rate in the designation signal to be transmitted through upward line in accordance with a target signal-signal-receipt error rate in downward line.

The first apparatus may determine a transmission ratio for transmitting the designation signal, in accordance with the target signal-signal-receipt error rate in downward line, to control the signal-signal-receipt error rate in the designation signal in the base stations making communication with the mobile station.

It is preferable that the first apparatus is constituted as an apparatus which determines the target signal interference ratio in the upward line in the base stations in accordance with the target signal-signal-receipt error rate in the downward line, while a power at which the mobile station transmits a signal is controlled in a closed-loop such that receipt quality in the upward line reaches a target signal interference ratio.

It is preferable that the first apparatus is constituted as an apparatus which determines a higher target signal interference ratio in the upward line for a lower target signal-signal-receipt error rate in the downward line.

It is preferable that the first apparatus is constituted as an apparatus which determines a power at which the mobile station transmits the designation signal, in accordance with a target signal-signal-receipt error rate in the downward line.

It is preferable that the first apparatus is constituted as an apparatus which, when the mobile station transmits both a control signal to which the designation signal is multiplexed and an information signal to the base stations, determines a higher ratio of the control signal to the information signal with respect to a power at which the mobile station transmits the control and information signals, for a smaller target receipt rate in the downward line.

It is preferable that the first apparatus is constituted as an apparatus which determines a signal length of the designation signal in accordance with a target signal-signal-receipt error rate in the downward line.

It is preferable that the first apparatus is constituted as an apparatus which determines higher redundancy of the designation signal for a smaller target signal-signal-receipt error rate in the downward line, if the designation signal is encoded for correcting errors.

It is preferable that the first apparatus is constituted as an apparatus which determines a longer signal interval between the designation signal and a next designation signal for a smaller target signal-signal-receipt error rate in the downward line, when the designation signal is designed to have a fixed number in bits per a unit time.

It is preferable that the first apparatus is constituted as an apparatus which determines a higher number in bits per a unit time in the designation signal for a smaller target signal-signal-receipt error rate in the downward line, when the designation signal is designed to have a fixed transmission interval.

There is further provided a base station controller for controlling a mobile station and a base station in a cellular system, wherein the mobile station establishes a communication line with N first base stations wherein N is an integer equal to or greater than one (1≦N), measures receipt quality in pilot signals transmitted from the N first base stations, determines M second base stations to make communication therethrough among the N first base stations, based on measurement results of the receipt quality, wherein M is an integer equal to or greater than one, but equal to or smaller than N(1≦M≦N), and transmits an designation signal to the M second base stations through upward line to designate the M second base stations as a base station through which the mobile station makes communication, and each of the base stations makes communication with the mobile station, if designated by the designation signal as a base station through which the mobile station makes communication, and does not make communication with the mobile station, if not designated by the designation signal, the base station controller further includes a first apparatus for varying conditions to determine the second base stations, in accordance with a target signal-signal-receipt error rate in downward line, to control the second base stations in number.

It is preferable that the first apparatus is constituted as an apparatus which, when the mobile station designates a base station which transmits the pilot signal hang receipt quality equal to or higher than a predetermined threshold, as the second base station, determines a higher threshold for a smaller target signal-signal-receipt error rate in the downward line.

It is preferable that the first apparatus is constituted as an apparatus which determines a higher number of the second base stations for a smaller target signal-receipt error rate in the downward line, when the mobile station designates a base station as the second base station by a predetermined number in the order of highness in the receipt quality of the pilot signal.

It is preferable that the first apparatus is constituted as an apparatus which determines all of the base stations as the second base station, if the target signal-receipt error rate in the downward line is equal to or smaller than a predetermined error rate.

In still another aspect of the present invention, there is provided a mobile station which defines a cellular system together with a plurality of base stations, wherein the mobile station establishes a communication line with N first base stations wherein N is an integer equal to or greater than one (1≦N), measures receipt quality in pilot signals transmitted from the N first base stations, determines M second base stations to make communication therethrough among the N first base stations, based on measurement results of the receipt quality, wherein M is an integer equal to or greater than one, but equal to or smaller than N(1≦M≦N), and transmits an designation signal to the M second base stations through upward line to designate the M second base stations as a base station through which the mobile station makes communication, and the mobile station includes a first apparatus for varying a signal-receipt error rate in the designation signal to be transmitted through upward line in accordance with a target signal-receipt error rate in downward line.

It is preferable that the first apparatus is constituted as an apparatus which determines a power at which the mobile station transmits the designation signal, in accordance with a target signal-receipt error rate in the downward line.

It is preferable that the first apparatus is constituted as an apparatus which, when the mobile station transmits both a control signal to which the designation signal is multiplexed and an information signal to the base stations, determines a higher ratio of the control signal to the information signal with respect to a power at which the mobile station transmits the control and information signals, for a smaller target receipt rate in the downward line.

It is preferable that the first apparatus is constituted as an apparatus which determines a signal length of the designation signal in accordance with a target signal-receipt error rate in the downward line.

It is preferable that the first apparatus is constituted as an apparatus which determines higher redundancy of the designation signal for a smaller target signal-receipt error rate in the downward line, if the designation signal is encoded for correcting errors.

It is preferable that the mobile station further includes a sixth apparatus which determines a longer signal interval between the designation signal and a next designation signal for a smaller target signal-receipt error rate in the downward line, when the designation signal is designed to have a fixed number in bits per a unit time.

It is preferable that the first apparatus is constituted as an apparatus which determines a higher number in bits per a unit time in the designation signal for a smaller target signal-receipt error rate in the downward line, when the designation signal is designed to have a fixed transmission interval.

There is further provided a mobile station which defines a cellular system together with a plurality of base stations, wherein the mobile station establishes a communication line with N first base stations wherein N is an integer equal to or greater than one (1≦N), measures receipt quality in pilot signals transmitted from the N first base stations, determines M second base stations to make communication therethrough among the N first base stations, based on measurement results of the receipt quality, wherein M is an integer equal to or greater than one, but equal to or smaller than N(1≦M≦N), and transmits an designation signal to the M second base stations through upward line to designate the M second base stations as a base station through which the mobile station makes communication, and the mobile station includes a first apparatus for varying conditions to determine the second base stations, in accordance with a target signal-receipt error rate in downward line, to control the second base stations in number.

It is preferable that the first apparatus is constituted as an apparatus which, when the mobile station designates a base station which transmits the pilot signal having receipt quality equal to or higher than a predetermined threshold, as the second base station, determines a higher threshold for a smaller target signal-receipt error rate in the downward line.

It is preferable that the first apparatus is constituted as an apparatus which determines a higher number of the second base stations for a smaller target signal-receipt error rate in the downward line, when the mobile station designates a base station as the second base station by a predetermined number in the order of highness in the receipt quality of the pilot signal.

It is preferable that the first apparatus is constituted as an apparatus which determines all of the base stations as the second base station, if the target signal-receipt error rate in the downward line is equal to or smaller than a predetermined error rate.

In yet another aspect of the present invention, there is provided a method of controlling power at which a signal is transmitted in a cellular system including a mobile station and a plurality of base stations, including the steps of (a) establishing a communication line with N first base stations wherein N is an integer equal to or greater than one (1≦N), (b) measuring receipt quality in pilot signals transmitted from the N first base stations, (c) determining M second base stations to make communication therethrough among the N first base stations, based on measurement results of the receipt quality, wherein M is an integer equal to or greater than one, but equal to or smaller than N(1≦M≦N), (d) transmitting an designation signal to the M second base stations through upward line to designate the M second base stations as a base station through which the mobile station makes communication, (e) making communication with the mobile station, if designated by the designation signal as a base station through which the mobile station makes communication, and does not making communication with the mobile station, if not designated by the designation signal, and (f) varying a signal-receipt error rate in the designation signal to be transmitted through upward line in accordance with a target signal-receipt error rate in downward line, the steps (a), (b), (c) and (d) being to be carried out by the mobile station, the step (e) being to be carried out by the base station.

For instance, the step (f) may include the step of determining a transmission ratio for transmitting the designation signal in accordance with the target signal-receipt error rate in downward line, to control the signal-receipt error rate in the designation signal in the base stations making communication with the mobile station.

It is preferable that the method further includes the step of determining the target signal interference ratio in the upward line in the base stations in accordance with the target signal-receipt error rate in the downward line, while a power at which the mobile station transmits a signal is controlled in a closed-loop such that receipt quality in the upward line reaches a target signal interference ratio.

It is preferable that the method further includes the step of determining a higher target signal interference ratio in the upward line for a lower target signal-receipt error rate in the downward line.

It is preferable that the method further includes the step of determining a power at which the mobile station transmits the designation signal, in accordance with a target signal-receipt error rate in the downward line.

It is preferable that the method further includes the step of, when the mobile station transmits both a control signal to which the designation signal is multiplexed and an information signal to the base stations, determining a higher ratio of the control signal to the information signal with respect to a power at which the mobile station transmits the control and information signals, for a smaller target receipt rate in the downward line.

It is preferable that the method further includes the step of determining a power at which the mobile station transmits the designation signal, in accordance with a target signal-receipt error rate in the downward line, the step being to be carried out by the mobile station.

It is preferable that the method further includes the step of, when the mobile station transmits both a control signal to which the designation signal is multiplexed and an information signal to the base stations, determining a higher ratio of the information signal to the control signal with respect to a power at which the mobile station transmits the information and control signals, for a smaller target receipt rate in the downward line.

It is preferable that the method further includes the step of determining a signal length of the designation signal in accordance with a target signal-receipt error rate in the downward line.

It is preferable that the method further includes the step of determining higher redundancy of the designation signal for a smaller target signal-receipt error rate in the downward line, if the designation signal is encoded for correcting errors.

It is preferable that the method further includes the step of determining a longer signal interval between the designation signal and a next designation signal for a smaller target signal-receipt error rate in the downward line, when the designation signal is designed to have a fixed number in bits per a unit time.

It is preferable that the method further includes the step of determining a higher number in bits per a unit time in the designation signal for a smaller target signal-receipt error rate in the downward line, when the designation signal is designed to have a fixed transmission interval.

It is preferable that the method further includes the step of determining a signal length of the designation signal in accordance with the target signal-receipt error rate in the downward line, the step being to be carried out by the mobile station.

It is preferable that the method further includes the step of determining higher redundancy of the designation signal for a smaller target signal-receipt error rate in the downward line, if the designation signal is encoded for correcting errors, the step being to be carried out by the mobile station.

It is preferable that the method further includes the step of determining a longer interval between the designation signals for a smaller target signal-receipt error rate in the downward line, when the designation signal is designed to have a fixed number of bits per a unit time, the step being to be carried out by the mobile station.

It is preferable that the method further includes the step of determining a higher number in bits per a unit time in the designation signal for a smaller target signal-receipt error rate in the downward line, when the designation signal is designed to have a fixed transmission interval, the step being to be carried out by the mobile station.

There is further provided a method of controlling power at which a signal is transmitted in a cellular system including a mobile station and a plurality of base stations, including the steps of (a) establishing a communication line with N first base stations wherein N is an integer equal to or greater than one (1≦N), (b) measuring receipt quality in pilot signals transmitted from the N first base stations, (c) determining M second base stations to make communication therethrough among the N first base stations, based on measurement results of the receipt quality, wherein M is an integer equal to or greater than one, but equal to or smaller than N(1≦M≦N), (d) transmitting an designation signal to the M second base stations through upward line to designate the M second base stations as a base station through which the mobile station makes communication, (e) making communication with the mobile station, if designated by the designation signal as a base station through which the mobile station makes communication, and does not making communication with the mobile station, if not designated by the designation signal, and (f) varying conditions to determine the second base stations, in accordance with a target signal-receipt error rate in downward line, to control the second base stations in number, the steps (a), (b), (c) and (d) being to be carried out by the mobile station, the step (e) being to be carried out by the base station.

It is preferable that the method further includes the step of, when the mobile station designates a base station which transmits the pilot signal having receipt quality equal to or higher than a predetermined threshold, as the second base station, determining a higher threshold for a smaller target signal-receipt error rate in the downward line. This step may be carried out by the mobile station.

It is preferable that the method further includes the step of determining a higher number of the second base stations for a smaller target signal-receipt error rate in the downward line, when the mobile station designates a base station as the second base station by a predetermined number in the order of highness in the receipt quality of the pilot signal. This step may be carried out by the mobile station.

It is preferable that the method further includes the step of determining all of the base stations as the second base station, if the target signal-receipt error rate in the downward line is equal to or smaller than a predetermined error rate. This step may be carried out by the mobile station.

The advantages obtained by the aforementioned present invention will be described hereinbelow.

In accordance with the present invention, a rate at which all base stations stop transmission of radio signals is controlled, based on a target signal-signal-receipt error rate required in downward line. Hence, it would be possible to reduce a signal-signal-receipt error rate for a control signal in a base station, and increase the number of designated base stations through which a mobile station makes communication with a base station, in accordance with a target signal-signal-receipt error rate in downward line. As a result, it would be possible to minimize influence to be exerted on a line capacity in upward or downward line, and an increase in a period for updating a transmission base station, and accomplish a target signal-signal-receipt error rate in downward line.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
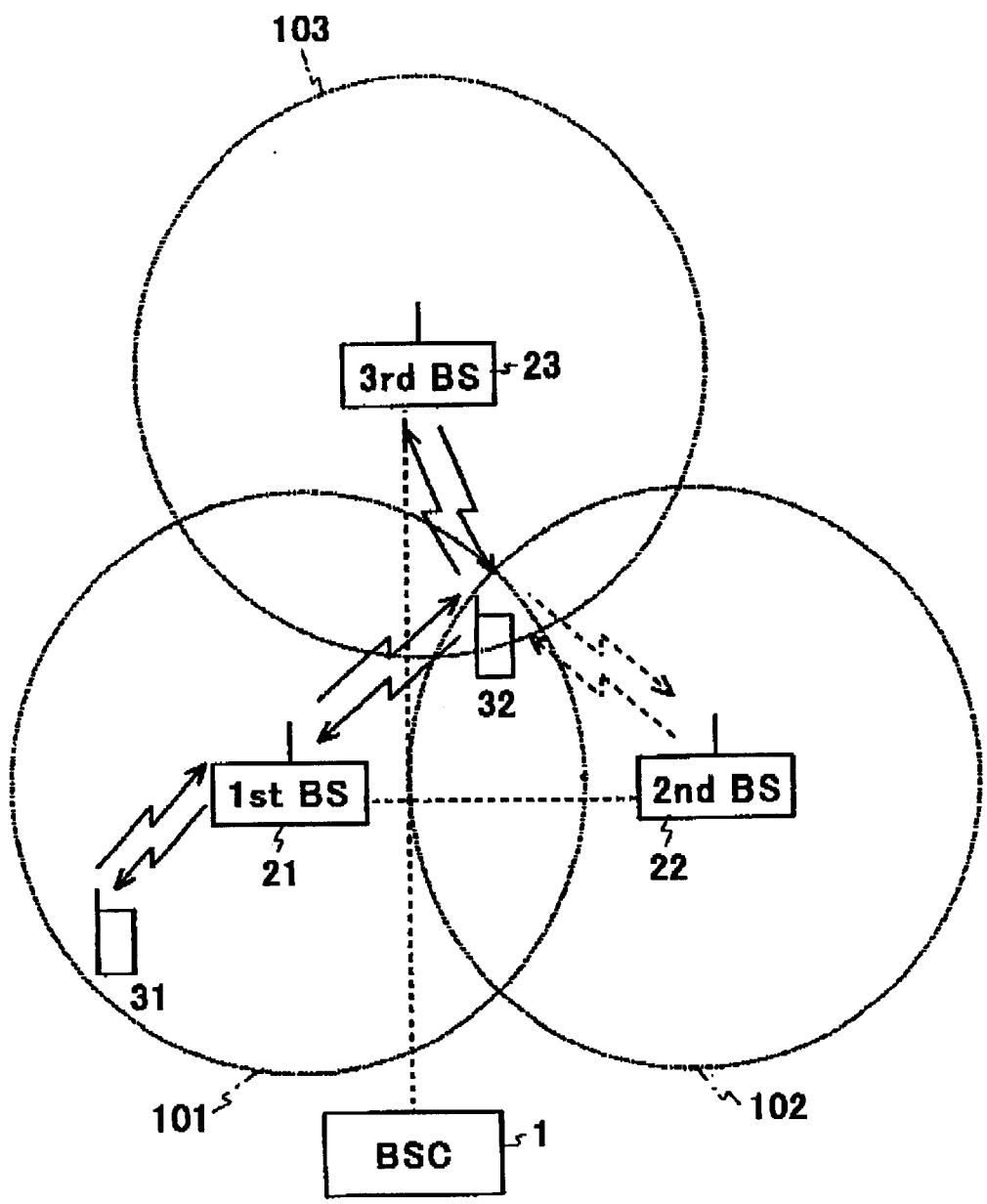
FIG. 1 is a block diagram of a cellular system in accordance with an embodiment of the present invention.

FIG. 1 is a block diagram of a cellular system in accordance with a preferred embodiment of the present invention. The illustrated cellular system operates in DS-CDMA (Direct Sequence-Code Division Multiple Access).

The illustrated cellular system includes L mobile stations, N base stations, and a base station controller 1, wherein L and N are integers equal to or greater than one. In the embodiment, L is set equal to 2, and N is set equal to 3. Hence, the cellular system includes first and second mobile stations 31 and 32, and first to third base stations 21, 22 and 23.

Each of the first and second mobile stations 31 and 32 establishes a line with the first to third base stations 21 to 23, and measures a level of pilot signals transmitted from the first to third base stations 21 to 23, determines M base stations as a base station with which each of the first and second mobile stations 31 and 32 makes communication (hereinafter, such a base station is referred to simply as "transmission base station"), based on the results of measurement of a level of the pilot signals, and transmits a designation signal by which a base station is designated as a transmission base station, to a base station or base stations through upward line. Herein, M is an integer equal to or greater than one. In the embodiment, it is assumed that the first and third base stations 21 and 23 are selected as a transmission base station.

On receipt of the designation signal, the first and third base stations 21 and 23 transmit radio signals to a mobile station through downward line, if designated as a transmission base station by the mobile station, and stops transmitting radio signals to a mobile station, if not designated as a transmission base station by the mobile station.

The first to third base stations 21 to 23 have cells 101, 102 and 103, respectively, and transmit radio signals to the first and second mobile stations 31 and 32, if they exist in the cells 101 to 103.

Each of the first to third base stations 21 to 23 is connected to and controlled by the base station controller (BSC) 1.

Each of the first to third base stations 21 to 23 transmits a common pilot signal at certain power to all of the mobile stations existing in the cells 101 to 103, an individual control signal to each of the mobile stations, and an individual information signal to each of the mobile stations. Power at which those signals are transmitted is controlled in high-rate closed loop control.

Each of the first and second mobile stations 31 and 32 establishes a line with a base station which transmits a common pilot signal exhibiting a maximum signal-receipt level, and a base station which transmits a common pilot signal exhibiting a signal-receipt level having a difference with the maximum signal-receipt level which difference is equal to or smaller than a predetermined threshold. In addition, each of the first and second mobile stations 31 and 32 periodically selects transmission base stations in the order of highness in signal-receipt level of the common pilot signal received from the first to third base stations 21 to 23, and then, transmits the designation signal to the selected transmission base stations together with an individual control signal in upward line.

It is assumed that the first mobile station 31 existing in the vicinity of a center of the cell 101 receives a common pilot signal from the first base station 21 at a best signal-receipt level, and receives common pilot signals from the second and third base stations 22 and 23 at a signal-receipt level having a difference with the above-mentioned best signal-receipt level which difference is greater than a predetermined threshold. Hence, the first mobile station 31 establishes a line only with the first base station 21.

It is also assumed that the second mobile station 32 existing in the vicinity of a boundary among the cells 101 to 103 receives common pilot signals from the first to third base stations 21 to 23 at signal-receipt levels having differences from one another which differences are equal to or smaller than a predetermined threshold. Hence, the second mobile station 32 establishes a line with all of the first to third base stations 21 to 23. However, the second base station 32 does not meet requirements necessary for being designated as a transmission base station. Hence, the second mobile stations 32 transmits a designation signal only to the first and third base stations 21 and 23 together with an individual control signal through upward line to idol the first and third base stations 21 and 23 that they are selected as transmission base stations.

Conditions for selecting a transmission base station or a designation signal by which a base station is selected as a transmission base station are(is) controlled in accordance with a target signal-receipt error rate in downward line. On receipt of the designation signal, the first and third base stations 21 and 23 transmit an individual control signal and an individual information signal to a mobile station or mobile stations, and the second base station 22 stops transmission of an individual information signal and transmits only an individual control signal.

Figure 2:
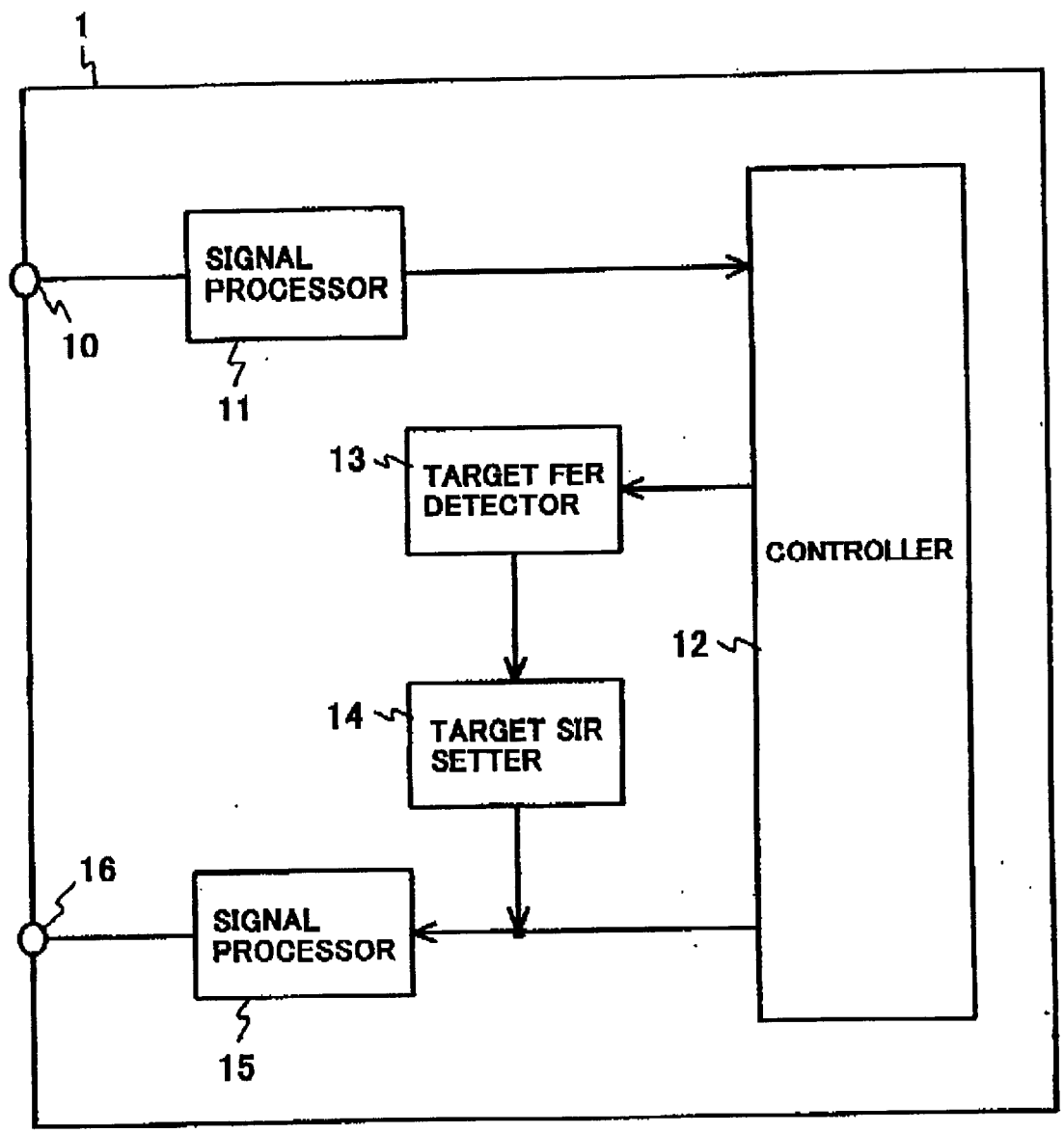
FIG. 2 is a block diagram of a base station controller in accordance with the first embodiment of the present invention.

FIG. 2 is a block diagram of the base station controller 1 in accordance with the first embodiment.

With reference to FIG. 2, the base station controller 1 is comprised of an input terminal 10 through which signals transmitted from the first to third base stations 21 to 23 are received, a signal processor 11 which processes received signals, a controller 12 which controls signal transmission to and signal receipt from the first to third base stations 21 to 23, a target FER detector 13 which detects a target frame error rate (FER) in downward line, transmitted from a host network, a target SIR setter 14 which determines a target signal interference ratio (SIR) in upward line to the fist to third base stations 21 to 23, in accordance with the detected target FER, a signal processor 15 which processes signals to be transmitted from the base station controller 1, and an output terminal 16 through which signals are transmitted to the first to third base stations 21 to 23.

The target SIR setter 14 determines a target SIR in upward line in the first to third base stations 21 to 23, multiplexes the thus determined target SIR to an individual control signal in downward line, and transmits the thus multiplexed signal to the first to third base stations 21 to 23.

Figure 3:
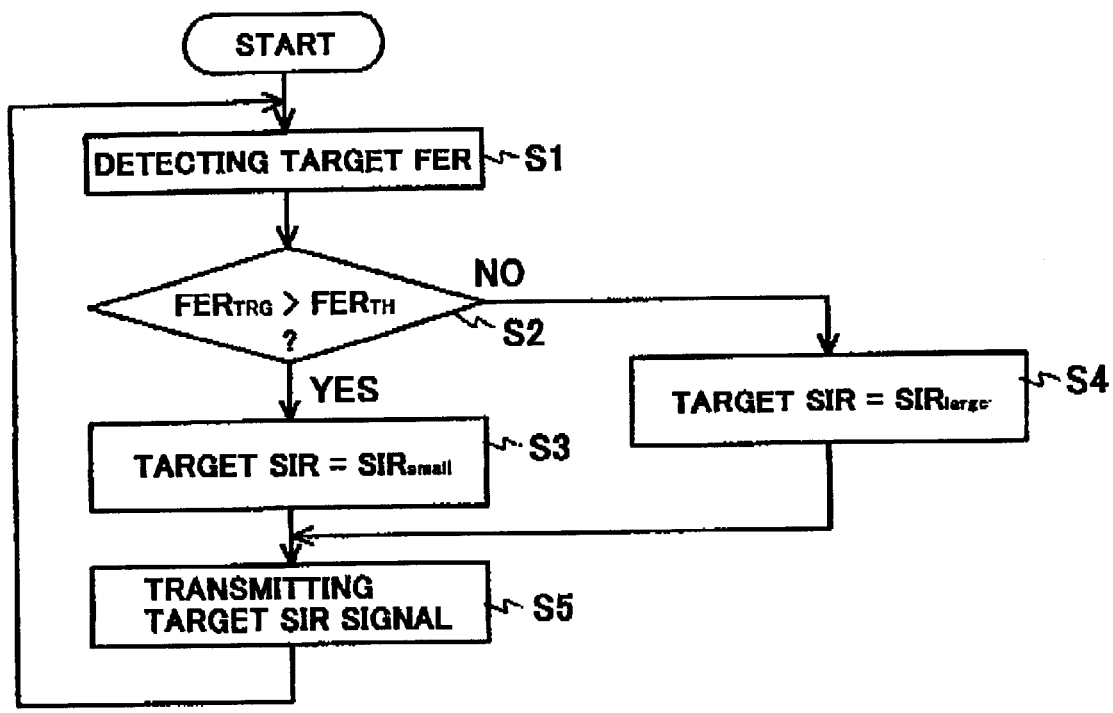
FIG. 3 is a flow chart showing an operation of the base station controller illustrated in FIG. 2.

FIG. 3 is a flow chart showing an operation of the base station controller 1 illustrated in FIG. 2.

Hereinbelow is explained a process, carried out by the base station controller 1, of transmitting a target SIR signal to the first to third base stations 21 to 23 when the base station controller 1 receives a target FER signal for downward line which target FER signal is irregularly transmitted to the base station controller 1.

When the base station controller 1 newly establishes a line with the second mobile station 32, or when a target FER in downward line is altered during communication is being made, the target FER detector 13 detects a target FER transmitted from a host network, in step S1.

The controller 12 checks whether the thus detected target FER ($FER_{TRG}$) is greater than a threshold FER ($FER_{TH}$), in step S2.

If the detected target FER ($FER_{TRG}$) is greater than a threshold FER ($FER_{TH}$) (YES in step S2), the controller 12 sets the target SIR in upward line equal to SIRsmall, in step S3. If the target FER ($FER_{TRG}$) is equal to or smaller than a threshold FER ($FER_{TH}$) (NO in step S2), the controller 12 sets the target SIR in upward line equal to SIRlarge, in step S4. Herein, SIRlarge is greater than SIRsmall (SIRlarge>SIRsmall).

Then, the controller 12 transmits a target SIR signal to the first and third base stations 21 and 23 through the signal processor 14 and the output terminal 16 to inform the first and third base stations 21 and 23 of the thus determined target SIR in upward line, in step S5.

On receipt of the target SIR signal from the base station controller 1, the first and third base stations 21 and 23 transmit a transmission power control (TPC) to the second mobile station 32. Power at which the second mobile station 32 transmits a radio signal is controlled in accordance with the received TPC signal such that SIR in the second mobile station 32 approaches the target SIR.

Each time the base station controller 1 receives a target FER in downward line from a host network, the base station controller 1 carries out such a control as mentioned above.

In accordance with the first embodiment, the target SIR in upward line is set higher for the lower target FER in downward line to thereby increase power at which the second mobile station 32 transmits a signal, and reduce signal-receipt error of the designation signal in the transmission base station(s). As a result, it would be possible to reduce possibility that a base station wrongly receives a designation signal, judges itself as a non-transmission base station, and stops all transmission of radio signals. Accordingly, it would be possible to reduce possibility that all of the base stations 21 and 23 stop transmitting radio signals, ensuring enhancement in signal-receipt quality in downward line and accomplishment of a target FER.

When the target FER is relatively high, the target SIR in upward line is set low accordingly. Hence, power at which the second mobile station 32 transmits a radio signal is also reduced, ensuring reduction in interference in upward line.

As mentioned above, the base station controller 1 in accordance with the first embodiment makes it possible to accomplish the target FER in downward line, prevent interference in upward line from increasing more than necessary, and increase a line capacity in upward line.

Figure 4:
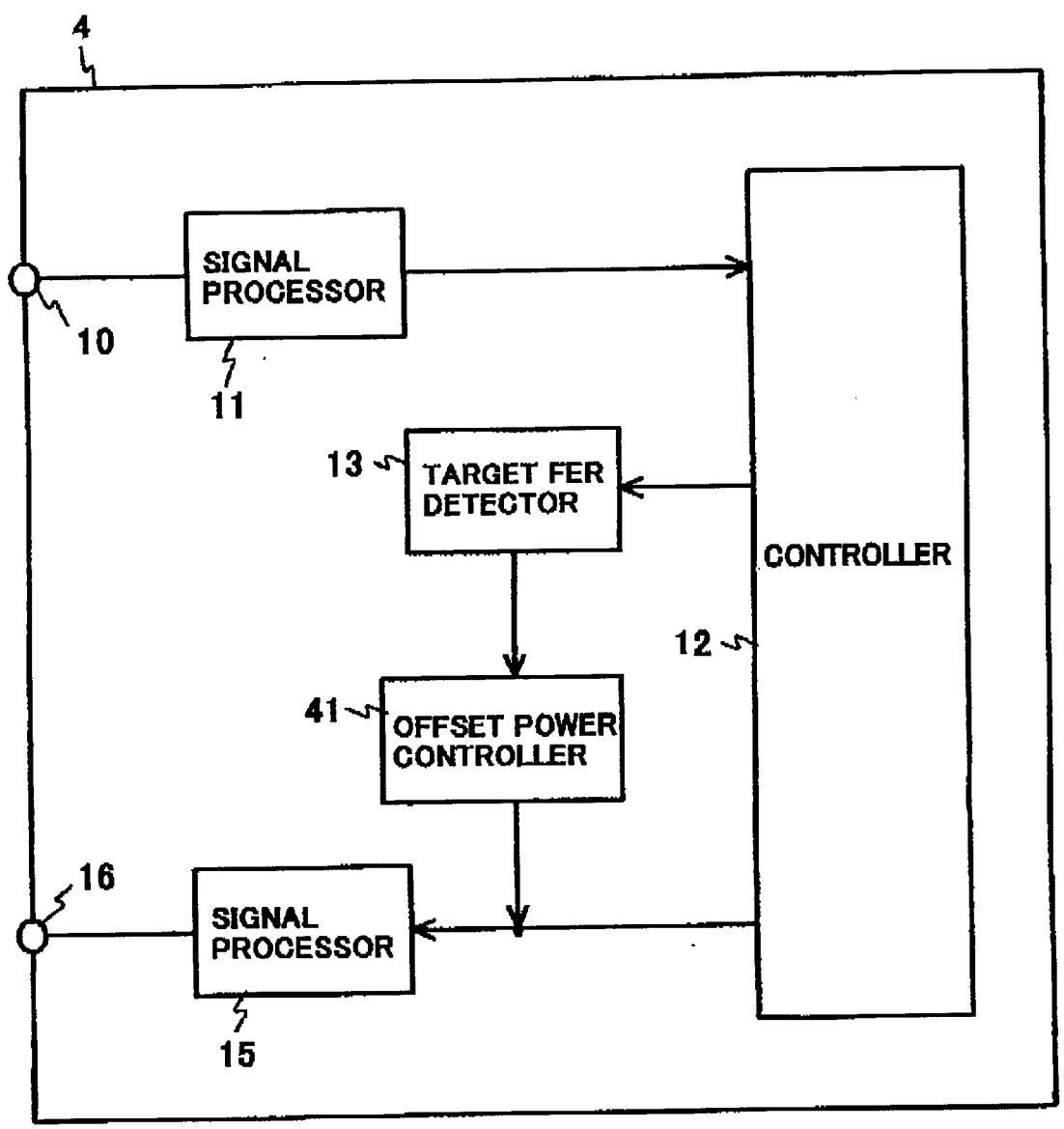
FIG. 4 is a block diagram of a base station controller in accordance with the second embodiment of the present invention.

FIG. 4 is a block diagram of a base station controller 4 in accordance with the second embodiment.

With reference to FIG. 4, the base station controller 4 in accordance with the second embodiment is designed to have the same structure as the structure of base station controller 1 illustrated in FIG. 2 except that the base station controller 4 includes an offset power controller 41 in place of the target SIR setter 14 illustrated in FIG. 2. Parts or elements that correspond to those of the base station controller 1 illustrated in FIG. 2 have been provided with the same reference numerals, and operate in the same manner as corresponding parts or elements in the base station controller 1.

The offset power controller 41 determines offset power of an individual control signal to an individual information signal in upward line in accordance with a target FER, and transmits the thus determined offset power to the second mobile station 32 in downward line through the first and third base stations 21 and 23.

Figure 5:
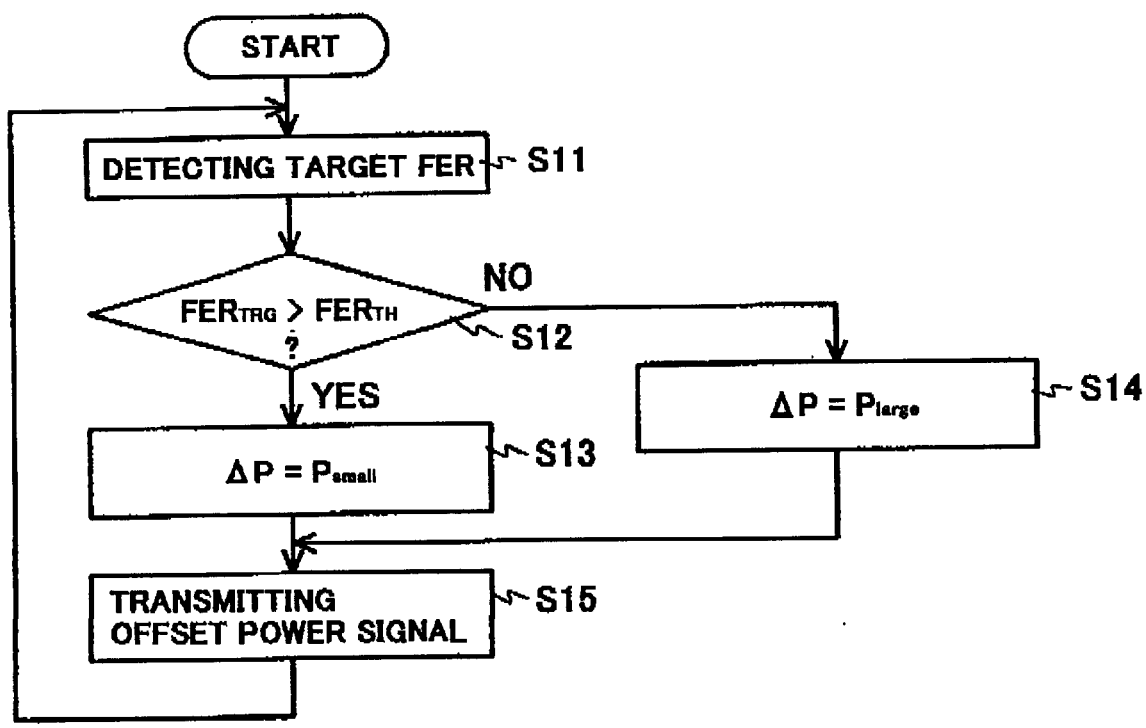
FIG. 5 is a flow chart showing an operation of the base station controller illustrated in FIG. 4.

FIG. 5 is a flow chart showing an operation of the base station controller 4 illustrated in FIG. 4.

Hereinbelow is explained a process, carried out by the base station controller 4, of transmitting an offset power signal to the second mobile station 32 when the base station controller 4 receives a target FER signal for downward line which target FER signal is irregularly transmitted to the base station controller 4.

When the base station controller 4 newly establishes a line with the second mobile station 32, or when a target FER in downward line is altered during communication is being made, the target FER detector 13 detects a target FER transmitted from a host network, in step S11.

The controller 12 checks whether the thus detected target FER ($FER_{TRG}$) is greater than a threshold FER ($FER_{TH}$), in step S12.

If the detected target FER ($FER_{TRG}$) is greater than a threshold FER ($FER_{TH}$) (YES in step S12), the controller 12 sets offset power ΔP equal to Psmall in step S13. If the target FER ($FER_{TRG}$) is equal to or smaller than a threshold FER ($FER_{TH}$) (NO in step S12), the controller 12 sets offset power ΔP equal to Plarge, in step S14. Herein, Plarge is greater than Psmall (Plarge>Psmall).

Then, the controller 12 transmits an offset power signal to the first and third base stations 21 and 23 through the signal processor 14 and the output terminal 16 to inform of the determined offset power, in step S15.

Each time the base station controller 4 receives a target FER in downward line from a host network, the base station controller 4 carries out such a control as mentioned above.

In accordance with the second embodiment, power at which the designation signal is transmitted in upward line is set higher for the lower target FER in downward line to thereby reduce signal-receipt error of the designation signal in the transmission base station(s). As a result, it would be possible to reduce possibility that a base station wrongly receives a designation signal, judges itself as a non-transmission base station, and stops all transmission of radio signals. Accordingly, it would be possible to reduce possibility that all of the base stations 21 and 23 stop transmitting radio signals, ensuring enhancement in signal-receipt quality in downward line and accomplishment of a target FER.

When the target FER is relatively high, the power at which the designation signal is transmitted in upward line is set low accordingly. Hence, interference in upward line can be reduced.

As mentioned above, the base station controller 4 in accordance with the second embodiment makes it possible to accomplish the target FER in downward line, and increase a line capacity in upward line.

Figure 6:
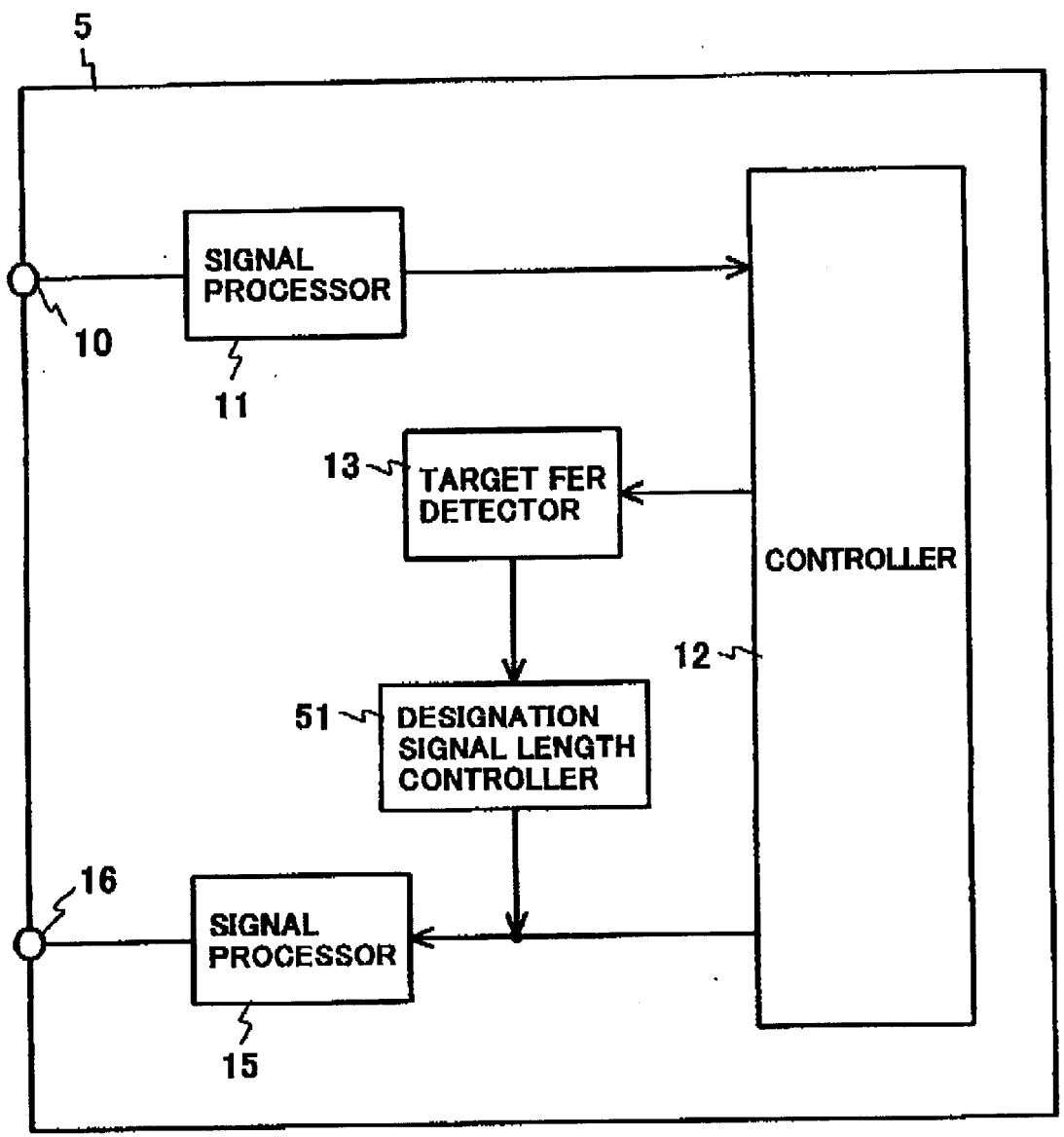
FIG. 6 is a block diagram of a base station controller in accordance with the third embodiment of the present invention.

FIG. 6 is a block diagram of a base station controller 5 in accordance with the third embodiment.

With reference to FIG. 6, the base station controller 5 in accordance with the third embodiment is designed to have the same structure as the structure of base station controller 1 illustrated in FIG. 2 except that the base station controller 5 includes a designation signal length controller 51 in place of the target SIR setter 14 illustrated in FIG. 2. Parts or elements that correspond to those of the base station controller 1 illustrated in FIG. 2 have been provided with the same reference numerals, and operate in the same manner as corresponding parts or elements in the base station controller 1.

The designation signal length controller 51 determines a signal length of a designation signal to be transmitted in upward line together with an individual control signal, in accordance with a target FER, and transmits the thus determined designation signal length to the second mobile station 32 in downward line through the first and third base stations 21 and 28.

Figure 7:
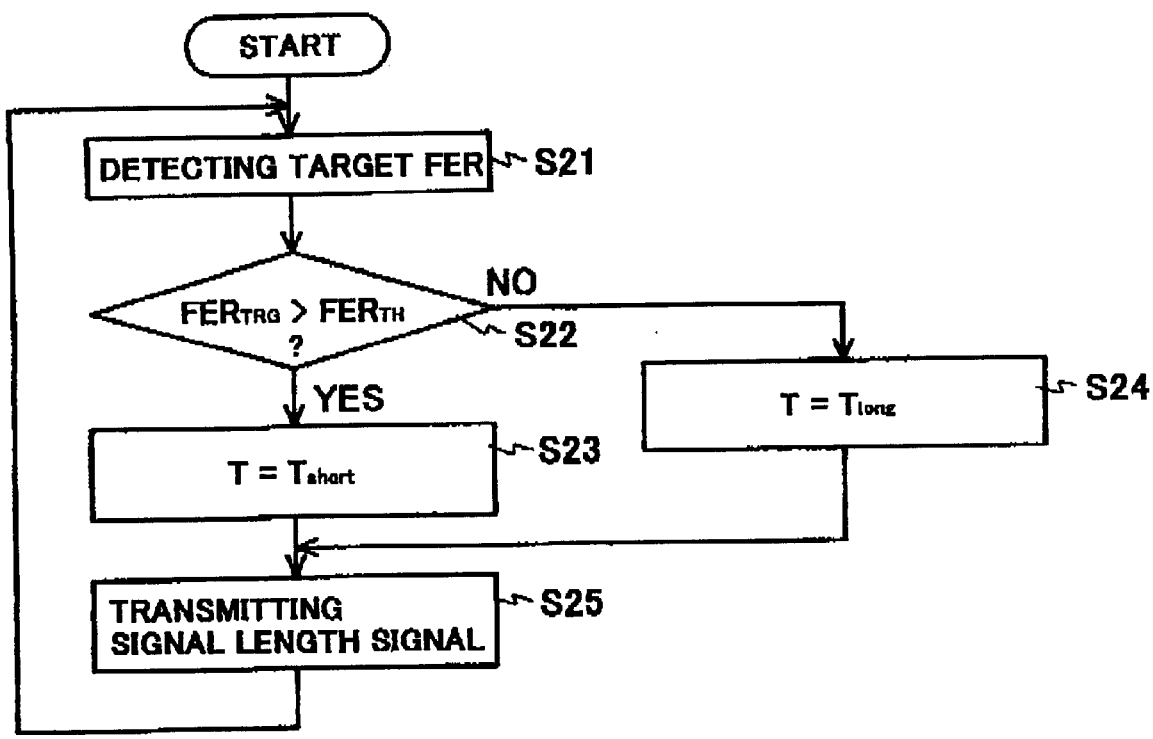
FIG. 7 is a flow chart showing an operation of the base station controller illustrated in FIG. 6.

FIG. 7 is a flow chart showing an operation of the base station controller 5 illustrated in FIG. 6.

Hereinbelow is explained a process, carried out by the base station controller 5, of transmitting an offset power signal to the second mobile station 32 when the base station controller 5 receives a target FER signal for downward line which target FER signal is irregularly transmitted to the base station controller 5.

When the base station controller 5 newly establishes a line with the second mobile station 32, or when a target FER in downward line is altered during communication is being made, the target FER detector 13 detects a target FER transmitted from a host network, in step S21.

The controller 12 checks whether the thus detected target FER ($FER_{TRG}$) is greater than a threshold FER ($FER_{TH}$), in step S22.

If the detected target FER ($FER_{TRG}$) is greater than a threshold FER ($FER_{TH}$) (YES in step S22), the controller 12 sets a signal length T of a designation signal equal to Tshort, in step S23. If the target FER ($FER_{TRG}$) is equal to or smaller than a threshold FER ($FER_{TH}$) (NO in step S22), the controller 12 sets a signal length T equal to Tlong, in step S24. Herein, Tlong is greater than Tshort (Tlong>Tshort).

Then, the controller 12 transmits a signal length signal to the first and third base stations 21 and 23 through the signal processor 14 and the output terminal 16 to inform of the determined signal length of a designation signal, in step S25.

Each time the base station controller 5 receives a target FER in downward line from a host network, the base station controller 5 carries out such a control as mentioned above.

In accordance with the third embodiment, a signal length of a designation signal to be transmitted in upward line is set longer and hence redundancy of the designation signal is set higher for the lower target FER in downward line to thereby reduce signal-receipt error of the designation signal in the transmission base station(s). As a result, it would be possible to reduce possibility that all of the base stations 21 and 23 stop transmitting radio signals, ensuring enhancement in signal-receipt quality in downward line and accomplishment of a target FER.

When the target FER is relatively high, a signal length of the designation signal is set low accordingly. A shorter signal length of the designation signal ensures that a period for updating a transmission base station can be shortened, and a rate of information bits for transmitting a designation signal in upward line can be reduced.

As mentioned above, the base station controller 5 in accordance with the third embodiment makes it possible to accomplish the target FER in downward line, enhance follow-up characteristic in updating a transmission base station, and increase a line capacity in upward line.

Figure 8:
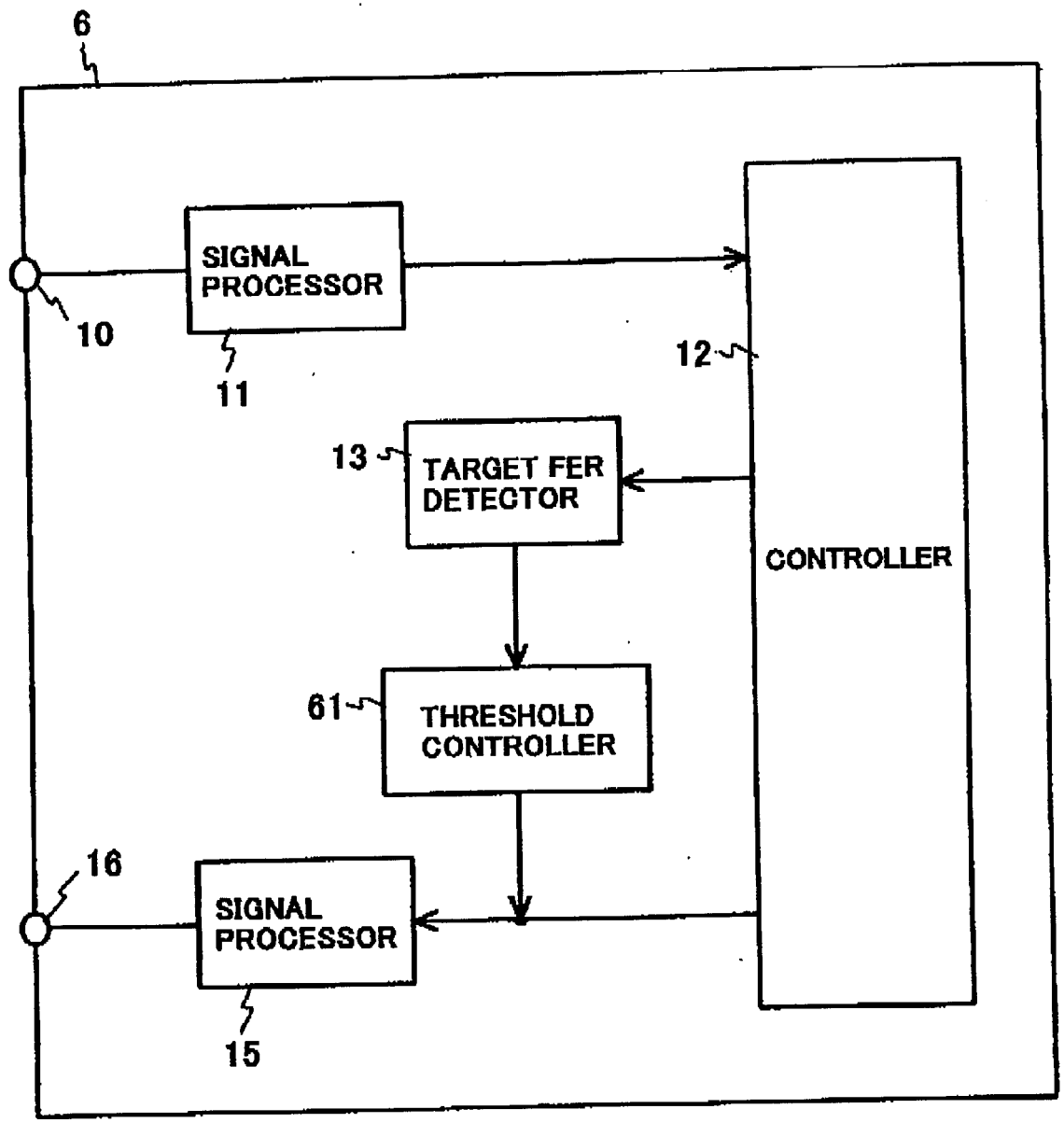
FIG. 8 is a block diagram of a base station controller in accordance with the fourth embodiment of the present invention.

FIG. 8 is a block diagram of a base station controller 6 in accordance with the fourth embodiment.

With reference to FIG. 8, the base station controller 6 in accordance with the fourth embodiment is designed to have the same structure as the structure of base station controller 1 illustrated in FIG. 2 except that the base station controller 6 includes a threshold controller 61 in place of the target SIR setter 14 illustrated in FIG. 2. Parts or elements that correspond to those of the base station controller 6 illustrated in FIG. 2 have been provided with the same reference numerals, and operate in the same manner as corresponding parts or elements in the base station controller 6.

The threshold controller 61 determines an internal threshold by which the second mobile station 32 determines a transmission base station in accordance with a target FER, and transmits the thus determined threshold to the second mobile station 32 in downward line through the first and third base stations 21 and 23.

Figure 9:
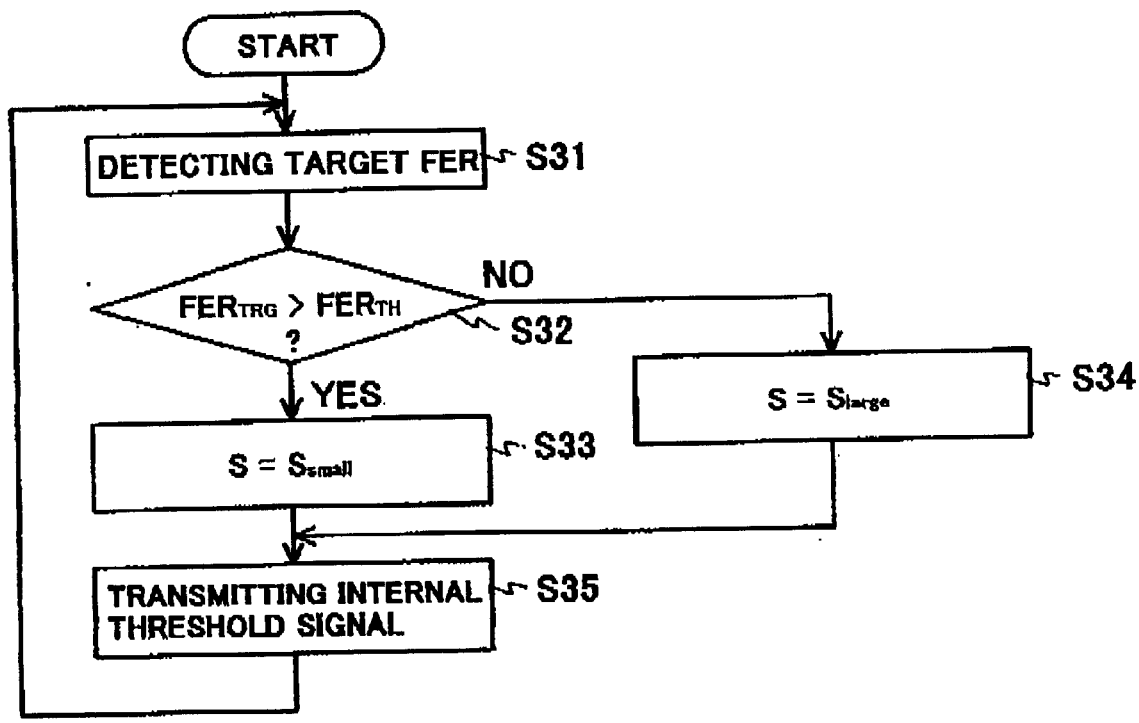
FIG. 9 is a flow chart showing an operation of the base station controller illustrated in FIG. 8.

FIG. 9 is a flow chart showing an operation of the base station controller 6 illustrated in FIG. 8.

Hereinbelow is explained a process, carried out by the base station controller 6, of transmitting an offset power signal to the second mobile station 32 when the base station controller 1 receives a target FER signal for downward line which target FER signal is irregularly transmitted to the base station controller 6.

When the base station controller 6 newly establishes a line with the second mobile station 32, or when a target FER in downward line is altered during communication is being made, the target FER detector 13 detects a target FER transmitted from a host network, in step S31.

The controller 12 checks whether the thus detected target FER ($FER_{TRG}$) is greater than a threshold FER ($FER_{TH}$), in step S32.

If the detected target FER ($FER_{TRG}$) is greater than a threshold FER ($FER_{TH}$) (YES in step S32), the controller 12 sets an internal threshold S equal to Ssmall, in step S33. If the target FER ($FER_{TRG}$) is equal to or smaller than a threshold FER ($FER_{TH}$) (NO in step S32), the controller 12 sets the internal threshold S equal to Slarge, in step S34. Herein, Slarge is greater than Ssmall (Slarge>Ssmall).

Then, the controller 12 transmits an internal threshold signal to the first and third base stations 21 and 23 through the signal processor 14 and the output terminal 16 to inform of the internal threshold, in step S35.

Each time the base station controller 6 receives a target FER in downward line from a host network, the base station controller 6 carries out such a control as mentioned above.

In accordance with the fourth embodiment, an internal threshold used for determining a transmission base station is set greater for the lower target FER in downward line to thereby increase the transmission base stations in number. As a result, even if one of the transmission base stations wrongly receives a designation signal and stops transmitting a radio signal, other transmission base stations are likely to keep transmitting radio signals. Accordingly, it would be possible to reduce possibility that all of the base stations 21 and 23 stop transmitting radio signals, ensuring accomplishment of a target FER in downward line.

When the target FER is relatively high, an internal threshold is set low accordingly. A lower internal threshold ensures that a base station to be designated as a transmission base station is reduced in number, and hence, interference in downward line, caused by a plurality of transmission of radio signals, can be reduced.

As mentioned above, the base station controller 6 in accordance with the fourth embodiment makes it possible to accomplish the target FER in downward line, reduce interference in downward line, and increase a line capacity in upward line.

Figure 10:
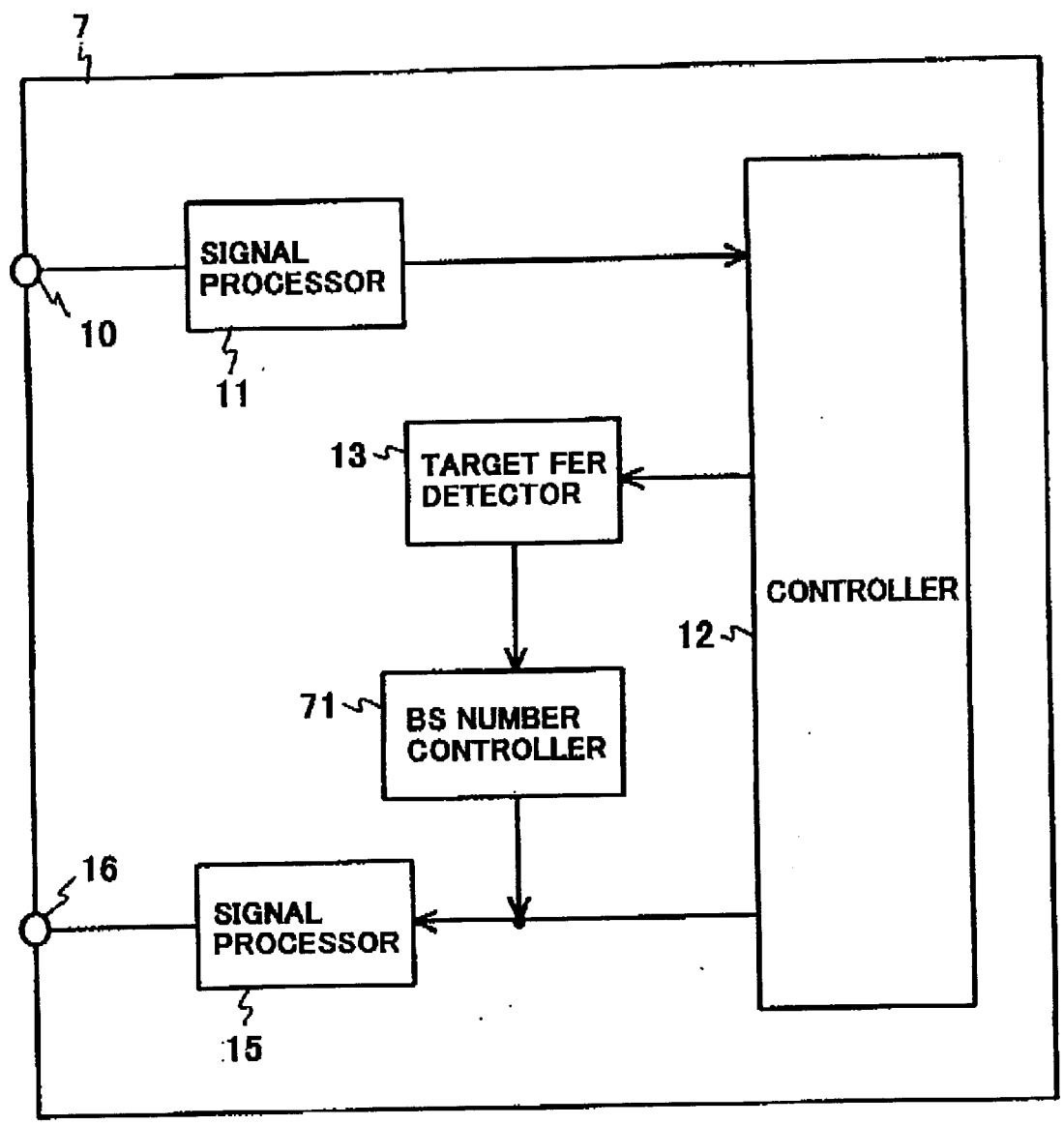
FIG. 10 is a block diagram of a base station controller in accordance with the fifth embodiment of the present invention.

FIG. 10 is a block diagram of a base station controller 7 in accordance with the fifth embodiment.

With reference to FIG. 10, the base station controller 7 in accordance with the fifth embodiment is designed to have the same structure as the structure of base station controller 1 illustrated in FIG. 2 except that the base station controller 7 includes a base station (BS) number controller 71 in place of the target SIR setter 14 illustrated in FIG. 2. Parts or elements that correspond to those of the base station controller 1 illustrated in FIG. 2 have been provided with the same reference numerals, and operate in the same manner as corresponding parts or elements in the base station controller 1.

The BS number controller 71 determines the number of transmission base stations to be selected by the second mobile station 82, in accordance with a target FER, and transmits the thus determined BS number to the second mobile station 32 in downward line through the first and third base stations 21 and 23.

Figure 11:
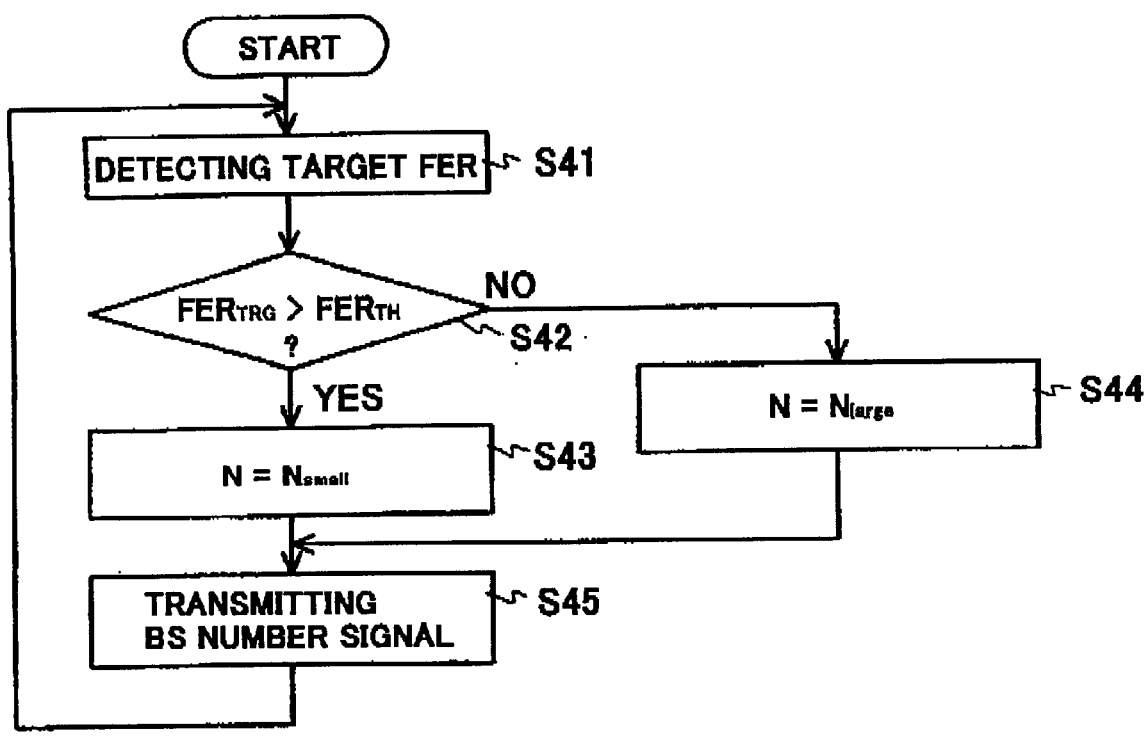
FIG. 11 is a flow chart showing an operation of the base station controller illustrated in FIG. 10.

FIG. 11 is a flow chart showing an operation of the base station controller 7 illustrated in FIG. 10.

Hereinbelow is explained a process, carried out by the base station controller 7, of transmitting an offset power signal to the second mobile station 32 when the base station controller 7 receives a target FER signal for downward line which target FER signal is irregularly transmitted to the base station controller 7.

When the base station controller 7 newly establishes a line with the second mobile station 32, or when a target FER in downward line is altered during communication is being made, the target FER detector 13 detects a target FER transmitted from a host network, in step S41.

The controller 12 checks whether the thus detected target FER ($FER_{TRG}$) is greater than a threshold FER ($FER_{TH}$), in step S42.

If the detected target FER ($FER_{TRG}$) is greater than a threshold FER ($FER_{TH}$) (YES in step S42), the controller 12 sets the number N of transmission base stations equal to Nsmall, in step S43. If the target FER ($FER_{TRG}$) is equal to or smaller than a threshold FER ($FER_{TH}$) (NO in step S42), the controller 12 sets the number N of transmission base stations equal to Nlarge, in step S44. Herein, Nlarge is greater than Nsmall (Nlarge>Nsmall).

Then, the controller 12 transmits a BS number signal to the first and third base stations 21 and 23 through the signal processor 14 and the output terminal 16 to inform of the number of transmission base stations, in step S45.

Each time the base station controller 7 receives a target FER in downward line from a host network, the base station controller 7 carries out such a control as mentioned above.

In accordance with the fifth embodiment, the number of transmission base stations to be selected by the second mobile station 32 is set greater for the lower target FER in downward line. As a result, even if one of the transmission base stations wrongly receives a designation signal and stops transmitting a radio signal, other transmission base stations are likely to keep transmitting radio signals. Accordingly, it would be possible to enhance signal-receipt quality in downward line, ensuring accomplishment of a target FER in downward line.

When the target FER is relatively high, the number of transmission base stations to be selected by the second mobile station 32 may be set low accordingly. Accordingly, similarly to the above-mentioned fourth embodiment, the base station controller 7 in accordance with the fifth embodiment makes it possible to accomplish the target FER in downward line, reduce interference in downward line, and increase a line capacity in upward line.

Figure 12:
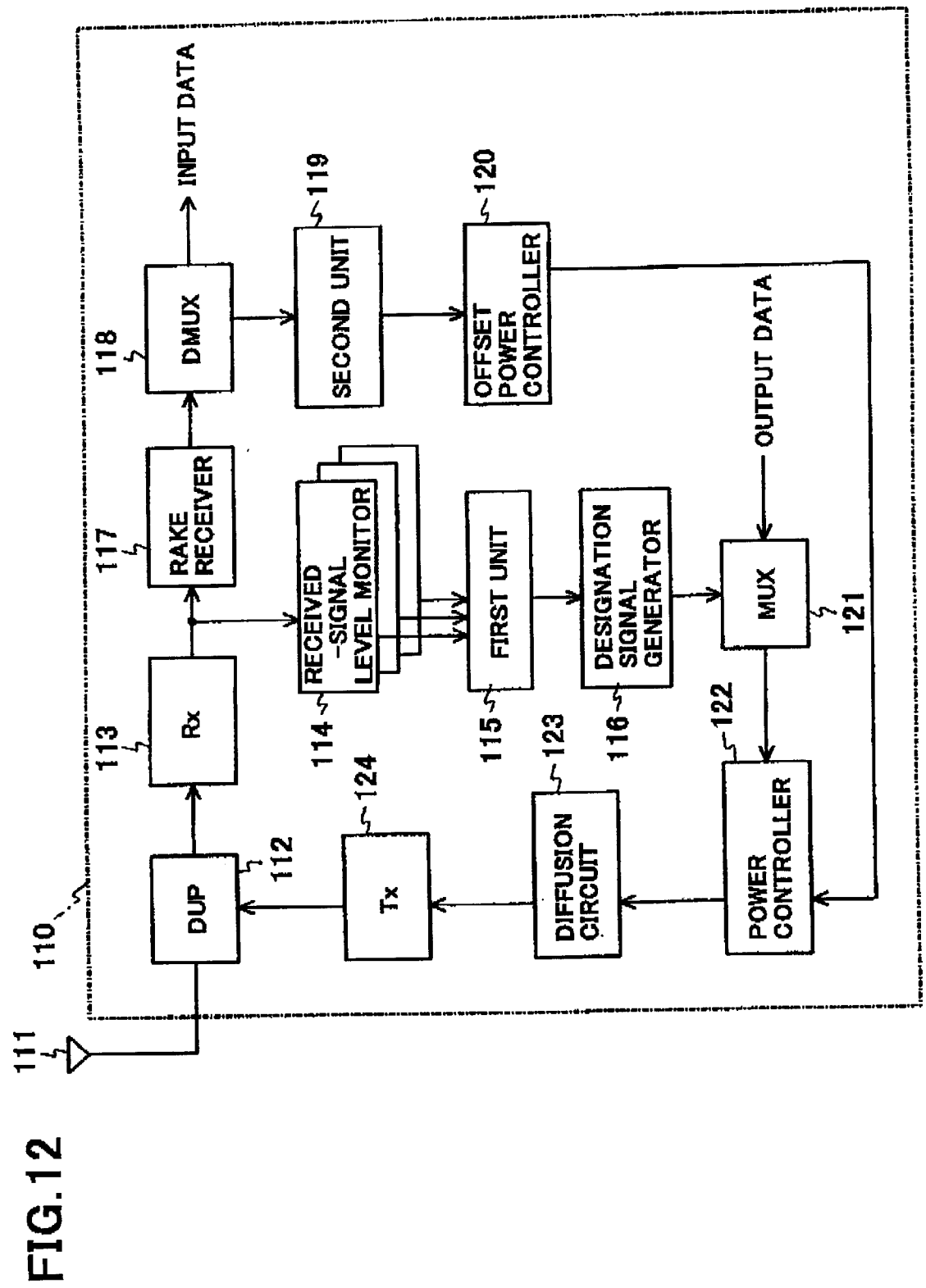
FIG. 12 is a block diagram of a mobile station in accordance with the sixth embodiment of the present invention.

FIG. 12 is a block diagram of a mobile station 110 in accordance with the sixth embodiment.

The mobile station 110 is comprised of an antenna 111 through which radio signals transmitted from the first and third base stations 21 and 23 are received, DUP 112 through a signal is transmitted and received, a radio signal receiver Rx 113 which converts a radio signal to a base-band signal a received-signal level monitor 114 which receives a pilot signal from a plurality of base stations and monitors a level of received radio signals, a first unit 115 for determining transmission base stations in accordance with the monitored level of the pilot signals, a designation signal generator 116 which generates a designation signal which designates transmission base stations determined by the first unit 115, a RAKE receiver 117 which synthesizes base signals transmitted from a plurality of transmission base stations, a demultiplexer 118, a second unit 119 which extracts a target FER information signal taken out in the demultiplexer 118, an offset power controller 120 which determines offset power for an individual control signal, a multiplexer 121 which multiplexes a designation signal and input data to each other to thereby generate an upward transmission signal, a power controller 122 which controls power at which a radio signal is transmitted through upward line, a diffusion circuit 128 which diffuses an upward transmission signal, and transmits a transmission base signal, and a radio signal transmitter TX 124 which converts a transmission base signal into a radio signal, and transmits the resultant radio signal.

The received-signal level monitor 114 receives pilot signals transmitted from the first to third base stations 21 to 23 having established a line with the mobile station 110, and transmits signal levels of the received pilot signals to the first unit 115. The first unit 115 determines base stations as a transmission base station in the order of highness of a level of the received pilot signals.

The offset power controller 120 compares the informed target FER to a predetermined threshold, determines offset power of an individual control signal to an individual information signal in upward line, and informs the power controller 122 of the thus determined offset power.

Figure 13:
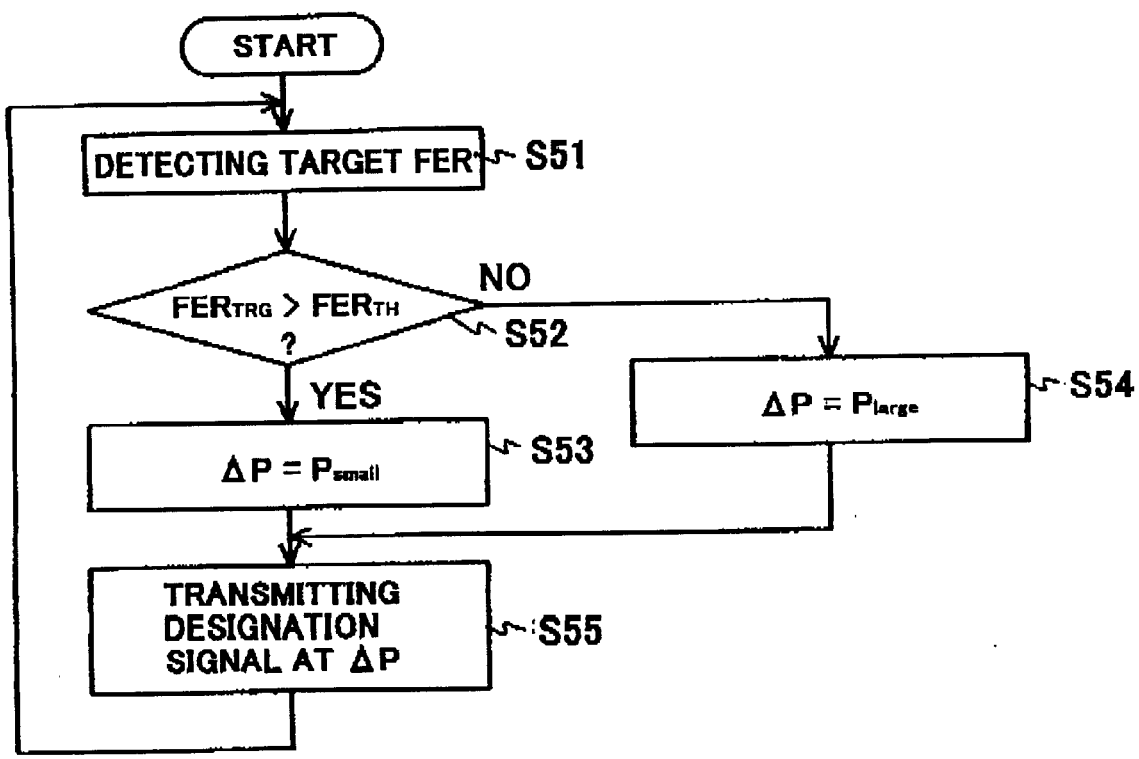
FIG. 13 is a flow chart showing an operation of the mobile station illustrated in FIG. 12.

FIG. 13 is a flow chart showing an operation of the mobile station 110 illustrated in FIG. 12.

Hereinbelow is explained a process, carried out by the mobile station 110, of controlling power at which a radio signal is transmitted through upward line, when the mobile station 110 receives a target FER signal for downward line which target FER signal is irregularly transmitted to the mobile station 110.

When the mobile station 110 newly establishes a line with a base station, or when a target FER in downward line is altered during communication is being made, the mobile station 110 receives a target FER information signal transmitted from the base station controller 1 through the first and third base stations 21 and 23 through downward line, in step S51.

On receipt of the target FER information Signal the second unit 119 extracts a target FER ($FER_{TRG}$) out of the received target FER information signal, and checks whether the thus extracted target FER ($FER_{TRG}$) is greater than a threshold FER ($FER_{TH}$), in step S52.

If the target FER ($FER_{TRG}$) is greater than a threshold FER ($FER_{TH}$) (YES in step S52), the offset power controller 120 sets offset power $\Delta P$ equal to Psmall, in step S53. If the target FER ($FER_{TRG}$) is equal to or smaller than a threshold FER ($FER_{TH}$) (NO in step S52), the offset power controller 120 sets offset power $\Delta P$ equal to Plarge, in step S54. Herein, Plarge is greater than Psmall (Plarge>Psmall).

Then, the mobile station 110 transmits both an individual control signal and an individual information signal through upward line at the determined offset power, in step S55.

Each time the mobile station 110 receives a target FER in downward line from the base station controller 1, the mobile station 110 carries out such a control as mentioned above.

The mobile station 110 in accordance with the sixth embodiment operates in the same manner as the base station controller 4 in accordance with the above-mentioned second embodiment except that whereas the base station controller 4 determines offset power in accordance with a target FER in the second embodiment, the mobile station 110 receives a target FER and determines offset power in the sixth embodiment.

Hence, in accordance with the sixth embodiment, power at which the designation signal is transmitted in upward line is set higher for the lower target FER in downward line to thereby reduce signal-receipt error of the designation signal in the transmission base station(s), similarly to the second embodiment. Accordingly, it would be possible to reduce possibility that all of the base stations 21 and 23 stop transmitting radio signals, ensuring accomplishment of a target FER.

When the target FER is relatively high, the power at which the designation signal is transmitted in upward line is set low accordingly. Hence, it is possible to accomplish the target FER in downward line, and increase a line capacity in upward line.

Figure 14:
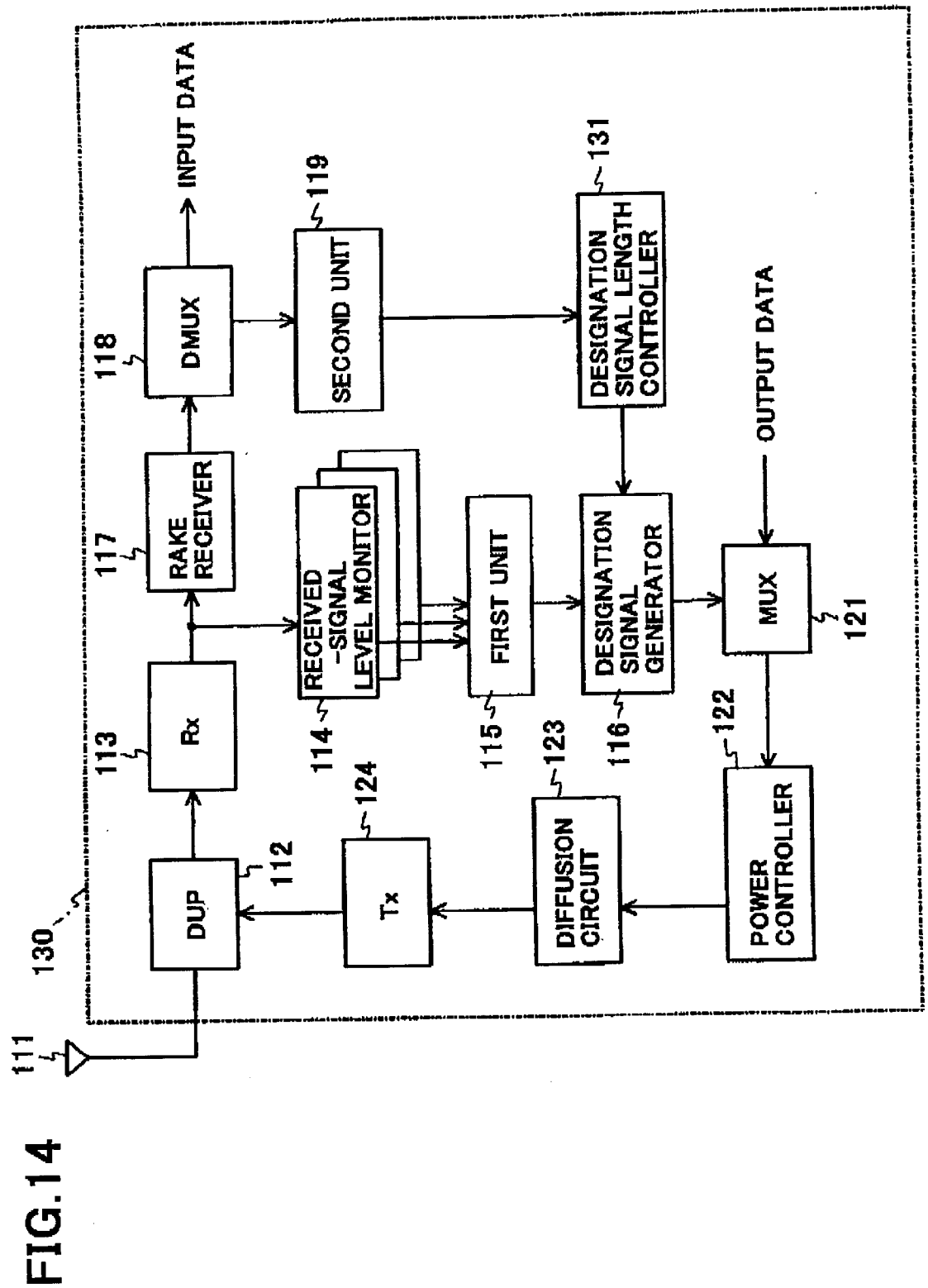
FIG. 14 is a block diagram of a mobile station in accordance with the seventh embodiment of the present invention.

FIG. 14 is a block diagram of a mobile station 130 in accordance with the seventh embodiment.

With reference to FIG. 14, the mobile station 130 in accordance with the seventh embodiment is designed to have the same structure as the structure of mobile station 110 illustrated in FIG. 12 except that the mobile station 130 includes a designation signal length controller 131 in place of the offset power controller 120 illustrated in FIG. 12. Parts or elements that correspond to those of the mobile station 110 illustrated in FIG. 12 have been provided with the same reference numerals, and operate in the same manner as corresponding parts or elements in the mobile station 110.

The designation signal length controller 131 determines a signal length of a designation signal by which a base station is designated as a transmission base station, in accordance with a target FER, and transmits the thus determined signal length to the designation signal generator 116. The designation signal generator 116 generates a designation signal having a signal length determined by the designation signal length controller 131.

Figure 15:
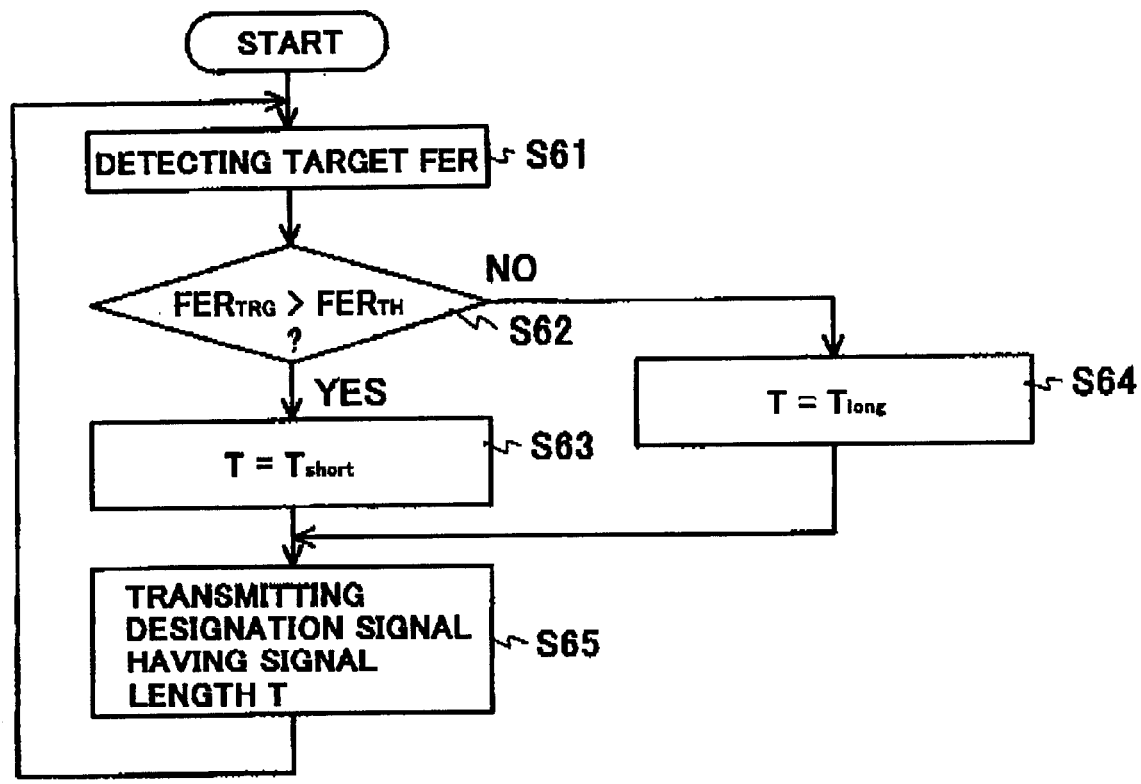
FIG. 15 is a flow chart showing an operation of the mobile station illustrated in FIG. 14.

FIG. 15 is a flow chart showing an operation of the mobile station 130 illustrated in FIG. 14.

Hereinbelow is explained a process, carried out by the mobile station 130, of transmitting a designation signal when the mobile station 130 receives a target FER signal for downward line which target FER signal is irregularly transmitted to the mobile station 130.

When the mobile station 130 newly establishes a line with a base station, or when a target FER in downward line is altered during communication is being made, the mobile station 130 receives a target FER information signal transmitted from the base station controller 1 through the first and third base stations 21 and 23 through downward line, in step S61.

On receipt of the target FER information signal, the second unit 119 extracts a target FER ($FER_{TRG}$) out of the received target FER information signal, and checks whether the thus extracted target FER ($FER_{TRG}$) is greater than a threshold FER ($FER_{TH}$), in step S62.

If the target FER ($FER_{TRG}$) is greater than a threshold FER ($FER_{TH}$) (YES in step S62), the designation signal length controller 131 sets a signal length T equal to Tshort, in step S63. If the target FER ($FER_{TRG}$) is equal to or smaller than a threshold FER ($FER_{TH}$) (NO in step S62), the designation signal length controller 131 sets a signal length T equal to Tlong, in step S64. Herein, Tlong is longer than Tshort (Tlong>Tshort).

Then, the designation signal length controller 131 transmits the thus determined signal length T to the designation signal generator 116. The designation signal generator 116 generates a designation signal having the signal length T determined by the designation signal length controller 131.

Then, the base station controller 130 transmits the designation signal together with an individual control signal through upward line, in step S65.

Each time the mobile station 130 receives a target FER in downward line from the base station controller 1, the mobile station 130 carries out such a control as mentioned above.

The mobile station 130 in accordance with the seventh embodiment operates in the same manner as the base station controller 5 in accordance with the above-mentioned third embodiment except that whereas the base station controller 5 determines a signal length of a designation signal in accordance with a target FER in the third embodiment, the mobile station 130 receives a target FER and determines a signal length of a designation signal in the seventh embodiment.

Hence, in accordance with the seventh embodiment, a designation signal to be transmitted through upward line is designed to have a longer signal length and higher redundancy for the lower target FER in downward line to thereby reduce signal-receipt error of the designation signal in the transmission base station(s), similarly to the third embodiment. Accordingly, it would be possible to reduce possibility that all of the base stations 21 and 23 stop transmitting radio signals, ensuring accomplishment of a target FER.

When the target FER is relatively high, a signal length of a designation signal is set low accordingly. A shorter signal length of the designation signal ensures that a period for updating a transmission base station can be shortened, or information bits per a frame in the designation signal can be reduced.

As mentioned above, the mobile station 130 in accordance with the seventh embodiment makes it possible to accomplish the target FER in downward line, enhance follow-up characteristic in updating a transmission base station, and enhance an efficiency at which radio signals are transmitted through upward line.

Figure 16:
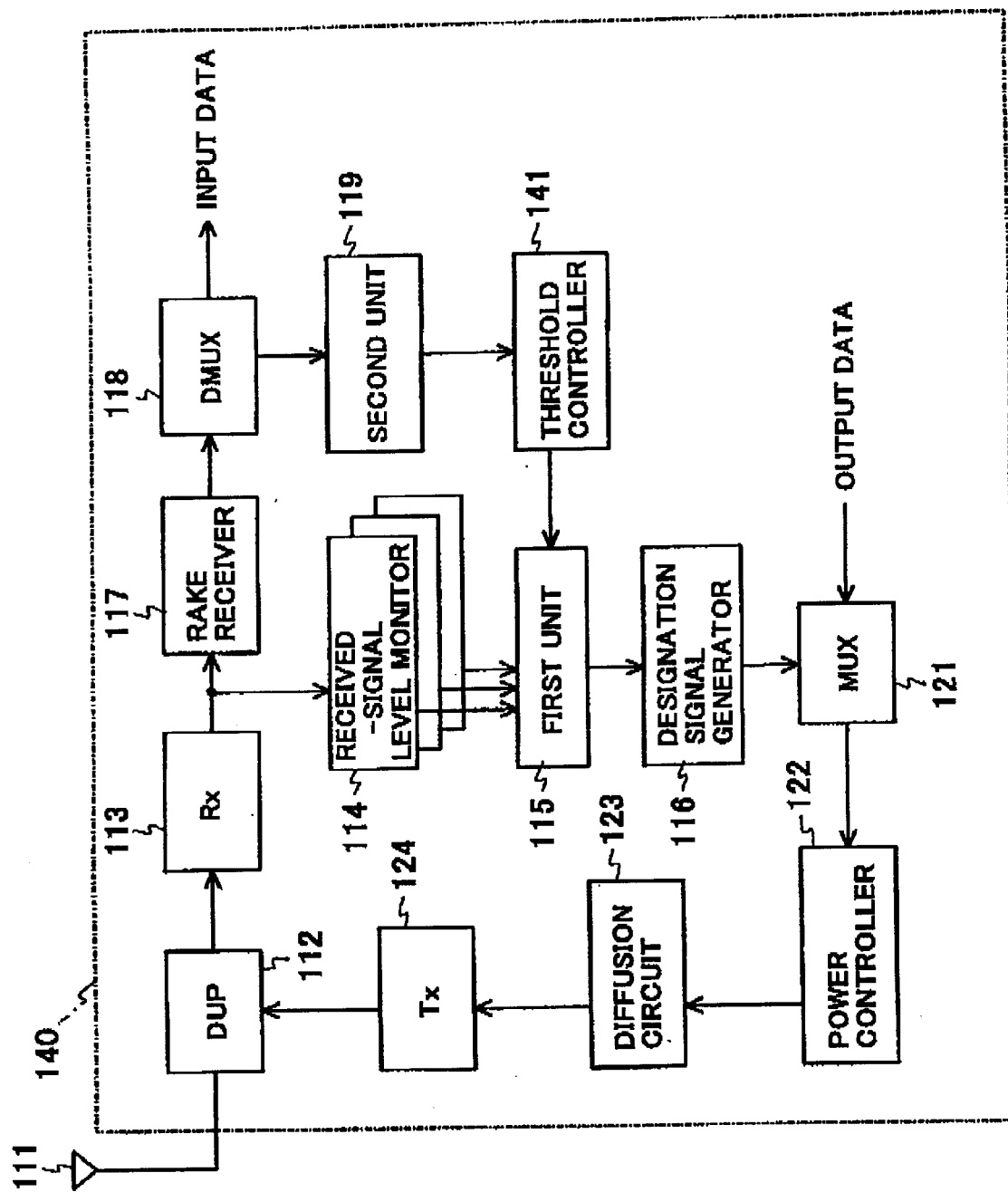
FIG. 16 is a block diagram of a mobile station in accordance with the eighth embodiment of the present invention.

FIG. 16 is a block diagram of a mobile station 140 in accordance with the eighth embodiment.

With reference to FIG. 16, the mobile station 140 in accordance with the eighth embodiment is designed to have the same structure as the structure of mobile station 110 illustrated in FIG. 12 except that the mobile station 140 includes a threshold controller 141 in place of the offset power controller 120 illustrated in FIG. 12. Parts or elements that correspond to those of the mobile station 110 illustrated in FIG. 12 have been provided with the same reference numerals, and operate in the same manner as corresponding parts or elements in the mobile station 110.

The threshold controller 141 determines an internal threshold based on which a transmission base stations is selected among base stations in accordance with a target FER, and transmits the thus determined internal threshold to the first unit 115. The first unit 115 determines a base station as a transmission base station which base station transmits a pilot signal having a level measured by the received-signal level monitor 114 as equal to or smaller than the internal threshold. Herein, it is assumed that the first and third base stations 21 and 23 are selected as transmission base stations.

Figure 17:
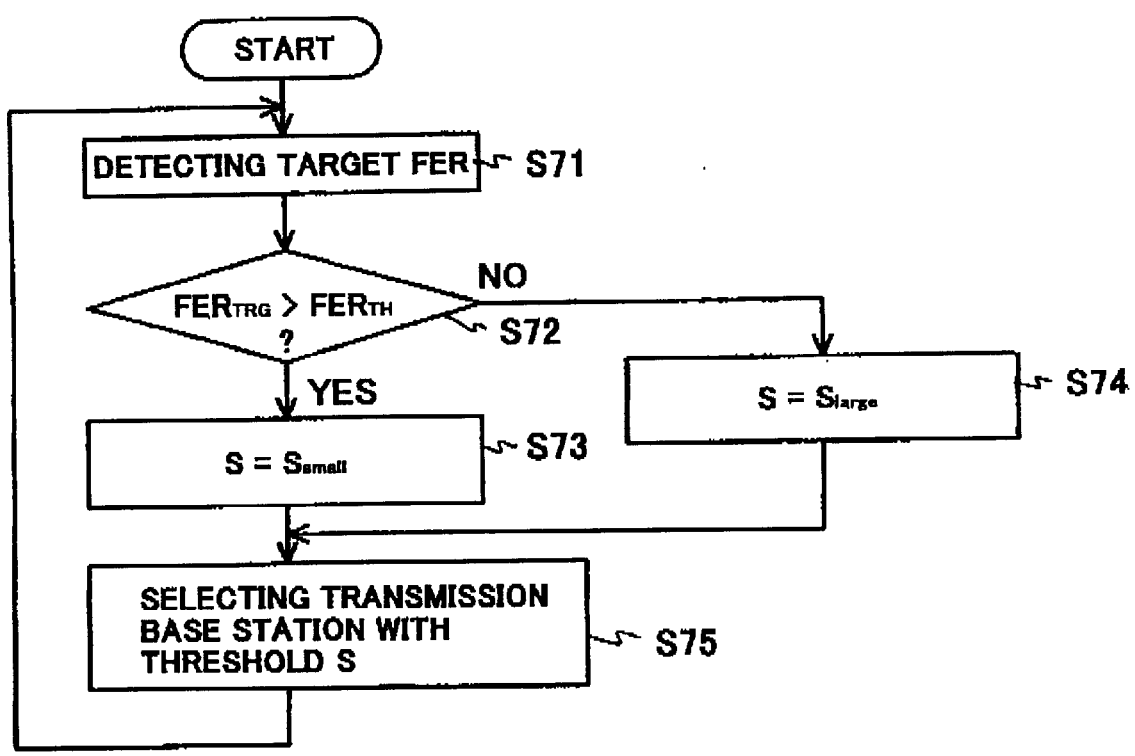
FIG. 17 is a flow chart showing an operation of the mobile station illustrated in FIG. 16.

FIG. 17 is a flow chart showing an operation of the mobile station 140 illustrated in FIG. 16.

Hereinbelow is explained a process, carried out by the mobile station 140, of determining an internal threshold when the mobile station 140 receives a target FER signal for downward line which target FER signal is irregularly transmitted to the mobile station 140.

When the mobile station 140 newly establishes a line with a base station, or when a target FER in downward line is altered during communication is being made, the mobile station 140 receives a target FER information signal transmitted from the base station controller 1 through the first and third base stations 21 and 23 through downward line, in step S71.

On receipt of the target FER information signal, the second unit 119 extracts a target FER ($FER_{TRG}$) out of the received target FER information signal, and checks whether the thus extracted target FER ($FER_{TRG}$) is greater than a threshold FER ($FER_{TH}$), in step S72.

If the target FER ($FER_{TRG}$) is greater than a threshold FER ($FER_{TH}$) (YES in step S72), the threshold controller 141 sets an internal threshold S equal to Ssmall, in step S73. If the target FER ($FER_{TRG}$) is equal to or smaller than a threshold FER ($FER_{TH}$) (NO in step S72), the threshold controller 141 sets an internal threshold S equal to Slarge, in step S74. Herein, Slarge is greater than Ssmall (Slarge>Ssmall).

Then, the threshold controller 141 transmits the thus determined signal length T to the designation signal generator 116 through the first unit 115. The designation signal generator 116 generates a designation signal having the signal length T determined by the threshold controller 141.

Then, the base station controller 140 transmits the designation signal together with an individual control signal through upward line, in step S75.

Each time the mobile station 140 receives a target FER in downward line from the base station controller 1, the mobile station 140 carries out such a control as mentioned above.

The mobile station 140 in accordance with the eighth embodiment operates in the same manner as the base station controller 6 in accordance with the above-mentioned fourth embodiment except that whereas the base station controller 6 determines an internal threshold in accordance with a target FER in the forth embodiment, the mobile station 140 receives a target FER and determines an internal threshold in the eighth embodiment.

In accordance with the eighth embodiment, an internal threshold used for determining a transmission base station is set greater for the lower target FER in downward line to thereby increase the transmission base stations in number. As a result, even if one of the transmission base stations wrongly receives a designation signal and stops transmitting a radio signal, other transmission base stations are likely to keep transmitting radio signals. Accordingly, it would be possible to reduce possibility that all of the base stations 21 and 23 stop transmitting radio signals, ensuring accomplishment of a target FER in downward line.

When the target FER is relatively high, an internal threshold is set low accordingly. A lower internal threshold ensures that a base station to be designated as a transmission base station is reduced in number, and hence, interference in downward line, caused by a plurality of transmission of radio signals, can be reduced.

As mentioned above, the mobile station 140 in accordance with the eighth embodiment makes it possible to accomplish the target FER in downward line, reduce interference in downward line, and increase a line capacity in upward line.

Figure 18:
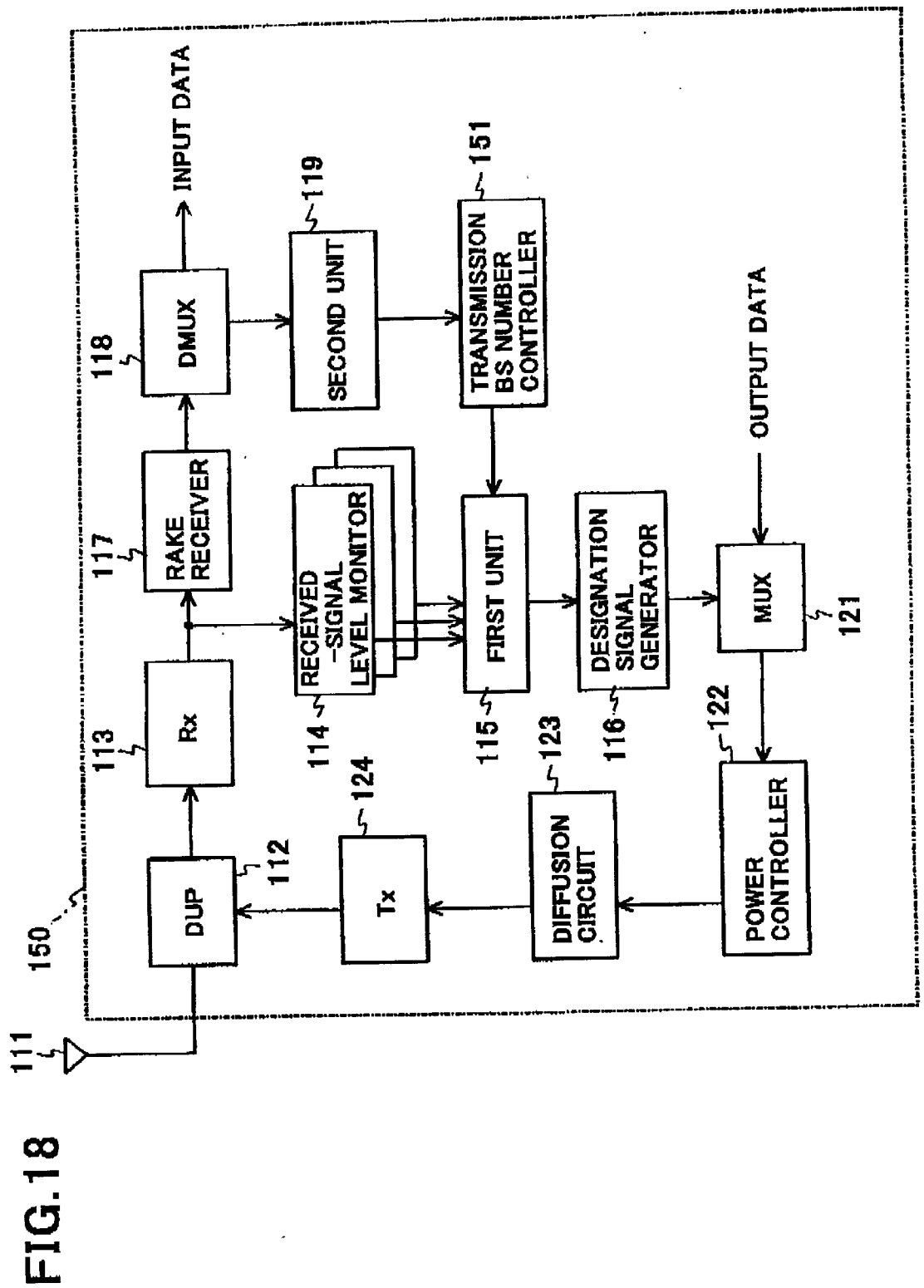
FIG. 18 is a block diagram of a mobile station in accordance with the ninth embodiment of the present invention.

FIG. 18 is a block diagram of a mobile station 150 in accordance with the ninth embodiment.

With reference to FIG. 18, the mobile station 150 in accordance with the ninth embodiment is designed to have the same structure as the structure of mobile station 110 illustrated in FIG. 12 except that the mobile station 150 includes a transmission base station number controller 151 in place of the offset power controller 120 illustrated in FIG. 12. Parts or elements that correspond to those of the mobile station 110 illustrated in FIG. 12 have been provided with the same reference numerals, and operate in the same manner as corresponding parts or elements in the mobile station 110.

The transmission base station number controller 151 determines the number of transmission base station in accordance with a target FER, and transmits the thus determined transmission base station number to the first unit 115. The first unit 115 determines a base station as a transmission base station by the number transmitted from the transmission base station number controller 151, in the order of highness in a pilot signal level measured by the received-signal level monitor 114.

Figure 19:
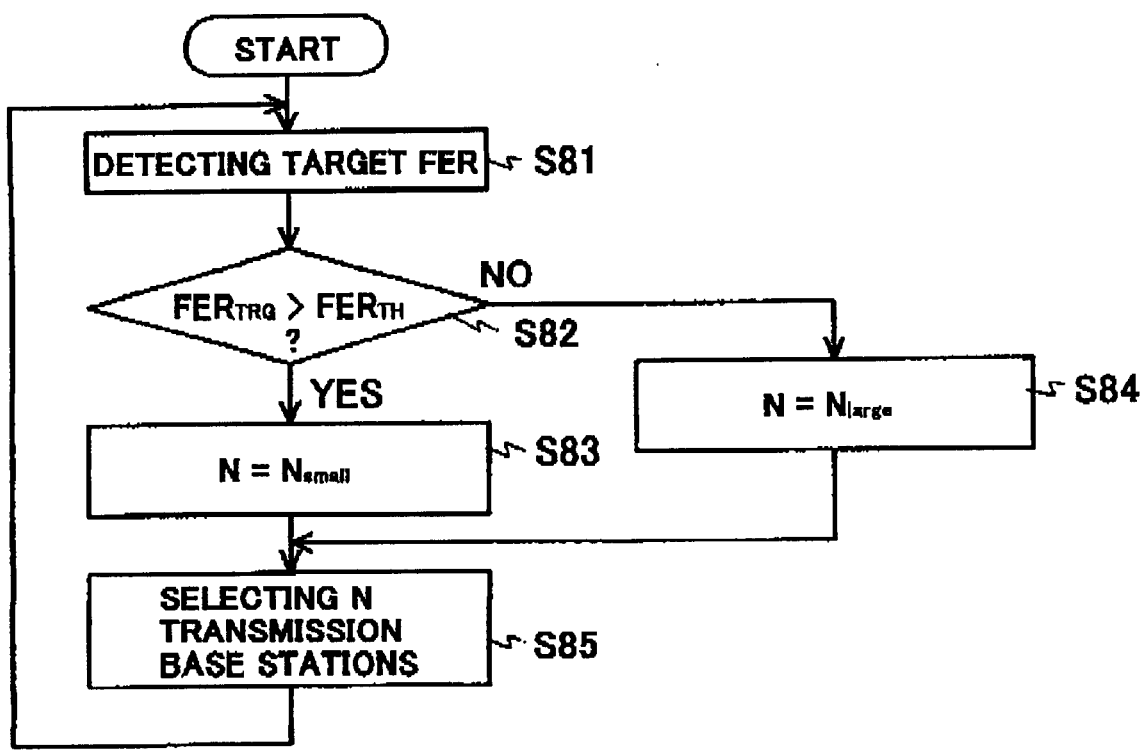
FIG. 19 is a flow chart showing au operation of the mobile station illustrated in FIG. 18.

FIG. 19 is a flow chart showing an operation of the mobile station 150 illustrated in FIG. 18.

Hereinbelow is explained a process, carried out by the mobile station 150, of determining the number of transmission base stations to be selected when the mobile station 150 receives a target FER signal for downward line which target FER signal is irregularly transmitted to the mobile station 150.

When the mobile station 150 newly establishes a line with a base station, or when a target FER in downward line is altered during communication is being made, the mobile station 150 receives a target FER information signal transmitted from the base station controller 1 through the first and third base stations 21 and 23 through downward line, in step S81.

On receipt of the target FER information signal, the second unit 119 extracts a target FER ($FER_{TRG}$) out of the received target FER information signal, and checks whether the thus extracted target FER ($FER_{TRG}$) is greater than a threshold FER ($FER_{TH}$), in step S82.

If the target FER ($FER_{TRG}$) is greater than a threshold FER ($FER_{TH}$) (YES in step S82), the transmission base station number controller 151 sets the number N of transmission base stations equal to Nsmall, in step S83. If the target FER ($FER_{TRG}$) is equal to or smaller than a threshold FER ($FER_{TH}$) (NO in step S82), the transmission base station number controller 151 sets the number N of transmission base stations equal to Nlarge, in step S84. Herein, Nlarge is greater than Nsmall (Nlarge>Nsmall).

Then, the mobile station 150 selects transmission base stations by the determined number in the order of highness in a pilot signal level, in step S85.

The mobile station 150 in accordance with the ninth embodiment operates in the same manner as the base station controller 7 in accordance with the above-mentioned fifth embodiment except that whereas the base station controller 7 determines the number of transmission base stations in accordance with a target FER in the fifth embodiment, the mobile station 150 receives a target FER and determines the number of transmission base stations in the ninth embodiment.

In accordance with the ninth embodiment, the number of transmission base stations to be selected in upward line is set greater for the lower target FER in downward line. As a result, even if one of the transmission base stations wrongly receives a designation signal and stops transmitting a radio signal, other transmission base stations are likely to keep transmitting radio signals, similarly to the fifth embodiment. Accordingly, it would be possible to reduce possibility that all of the base stations 21 and 23 stop transmission of radio signals, ensuring accomplishment of a target FER in downward line.

When the target FER is relatively high, the number of transmission base stations may be set low accordingly. Accordingly, similarly to the above-mentioned fifth embodiment, the mobile station 150 in accordance with the ninth embodiment makes it possible to accomplish the target FER in downward line, reduce interference in downward line, and increase a line capacity in upward line.

In the above-mentioned first to ninth embodiments, the present invention is applied to a cellular system operating in DS-CDMA. However, it should be noted that the present invention might be applied to a cellular system operating in other access systems.

In addition, one threshold to be compared to a target FER is determined in the present invention. However, a plurality of thresholds might be used for comparing to a target FER such that power at which a designation signal is transmitted, a signal length, an internal threshold and/or the number of transmission base stations can be determined in steps.

In the cellular system illustrated in FIG. 1, the base station controller 1 is formed separately from the first to third base stations 21 to 23. However, the base station controller 1 might be equipped in each of the base stations 21 to 23 in the cellular system illustrated in FIG. 1.

As mentioned above, a possibility that all of the base stations stop transmission of radio signals in downward line can be varied by controlling a signal-receipt error rate of a designation signal in a transmission base station, or by controlling the number of transmission base stations.

In conventional cellular systems, a line capacity in upward and/or downward line is reduced, and a period for updating transmission base stations is increased, when such a possibility as mentioned above is increased.

In contrast, the present invention controls a possibility that all of base stations stop transmission of radio signals, in accordance with target quality, to thereby prevent both reduction in a line capacity in upward and/or downward line and increase in a period for updating transmission base stations. As a result, the present invention can accomplish target quality in downward line.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-071369 filed on Mar. 14, 2001 including specification, claims, drawings and summary is incorporated herein by reference in its entirety.

What is claimed is:

1. A cellular system comprising at least one mobile station and a plurality of base stations,
   wherein said mobile station establishes a communication line with N first base stations wherein N is an integer equal to or greater than one ($1 \leq N$), measures receipt quality in pilot signals transmitted from said N first base stations, determines M second base stations to make communication therethrough among said N first base stations, based on measurement results of said receipt quality, wherein M is an integer equal to or greater than one, but equal to or smaller than N($1 \leq M \leq N$), and transmits an designation signal to said M second base stations through upward line to designate said M second base stations as a base station through which said mobile station makes communication, and
   each of said base stations makes communication with said mobile station, if designated by said designation signal as a base station through which said mobile station makes communication, and does not make communication with said mobile station, if not designated by said designation signal,
   said cellular system further includes a first apparatus for varying a signal-signal-receipt error rate in said designation signal to be transmitted through upward line in accordance with a target signal-signal-receipt error rate in downward line.

2. The cellular system as set forth in claim 1, wherein said first apparatus determines a transmission ratio for transmitting said designation signal, in accordance with said target signal-signal-receipt error rate in downward line, to control said signal-signal-receipt error rate in said designation signal in said base stations making communication with said mobile station.

3. The cellular system as set forth in claim 1, further comprising a base station controller which controls said base stations making communication with said mobile station, and wherein said base station controller includes said first apparatus therein.

4. The cellular system as set forth in claim 1, wherein each of said base stations includes first said apparatus.

5. The cellular system as set forth in claim 1, further comprising a base station controller which controls said base stations making communication with said mobile station, and wherein said base station controller includes said first apparatus constituted as an apparatus which determines said target signal interference ratio in said upward line in said base stations in accordance with said target signal-signal-receipt error rate in said downward line, while a power at which said mobile station transmits a signal is controlled in a closed-loop such that receipt quality in said upward line reaches a target signal interference ratio.

6. The cellular system as set forth in claim 1, further comprising a base station controller which controls said base stations making communication with said mobile station, and wherein said base station controller includes said first apparatus constituted as an apparatus which determines a higher target signal interference ratio in said upward line for a lower target signal-signal-receipt error rate in said downward line.

7. The cellular system as set forth in claim 1, further comprising a base station controller which controls said base stations making communication with said mobile station, and wherein said base station controller includes said first apparatus constituted as an apparatus which determines a power at which said mobile station transmits said designation signal, in accordance with a target signal-signal-receipt error rate in said downward line.

8. The cellular system as set forth in claim 1, further comprising a base station controller which controls said base stations making communication with said mobile station, and wherein said base station controller includes said first apparatus constituted as an apparatus which, when said mobile station transmits both a control signal to which said designation signal is multiplexed and an information signal to said base stations, determines a higher ratio of said control signal to said information signal with respect to a power at which said mobile station transmits said control and information signals, for a smaller target receipt rate in said downward line.

9. The cellular system as set forth in claim 1, wherein said mobile station includes said first apparatus constituted as an apparatus which determines a power at which said mobile station transmits said designation signal, in accordance with a target signal-signal-receipt error rate in the downward line.

10. The cellular system as set forth in claim 1, wherein said mobile station includes said first apparatus constituted as an apparatus which, when said mobile station transmits both a control signal to which said designation signal is multiplexed and an information signal to said base stations, determines a higher ratio of said information signal to said control signal with respect to a power at which said mobile station transmits said information and control signals, for a smaller target receipt rate in said downward line.

11. The cellular system as set forth in claim 1, further comprising a base station controller which controls said base stations making communication with said mobile station, and wherein said base station controller includes said first apparatus constituted as an apparatus which determines a signal length of said designation signal in accordance with a target signal-signal-receipt error rate in said downward line.

12. The cellular system as set forth in claim 1, further comprising a base station controller which controls said base stations making communication with said mobile station, and wherein said base station controller includes said first apparatus constituted as an apparatus which determines higher redundancy of said designation signal for a smaller target signal-signal-receipt error rate in said downward line, if said designation signal is encoded for correcting errors.

13. The cellular system as set forth in claim 1, further comprising a base station controller which controls said base stations making communication with said mobile station, and wherein said base station controller includes said first apparatus constituted as an apparatus which determines a longer signal interval between said designation signal and a next designation signal for a smaller target signal-signal-receipt error rate in the downward line, when said designation signal is designed to have a fixed number in bits per a unit time.

14. The cellular system as set forth in claim 1, further comprising a base station controller which controls said base stations making communication with said mobile station, and wherein said base station controller includes said first apparatus constituted as an apparatus which determines a higher number in bits per a unit time in said designation signal for a smaller target signal-signal-receipt error rate in the downward line, when said designation signal is designed to have a fixed transmission interval.

15. The cellular system as set forth in claim 1, wherein said mobile station includes said first apparatus constituted as an apparatus which determines a signal length of said designation signal in accordance with said target signal-signal-receipt error rate in said downward line.

16. The cellular system as set forth in claim 1, wherein said mobile station includes said first apparatus constituted as an apparatus which determines higher redundancy of said designation signal for a smaller target signal-signal-receipt error rate in said downward line, if said designation signal is encoded for correcting errors.

17. The cellular system as set forth in claim 1, wherein said mobile station includes said first apparatus constituted as an apparatus which determines a longer interval between said designation signals for a smaller target signal-signal-receipt error rate in the downward line, when said designation signal is designed to have a fixed number of bits per a unit time.

18. The cellular system as set forth in claim 1, wherein said mobile station includes said fit apparatus constituted as an apparatus which determines a higher number in bits per a unit time in said designation signal for a smaller target signal-signal-receipt error rate in the downward line, when said designation signal is designed to have a fixed transmission interval.

19. A cellular system comprising at least one mobile station and a plurality of base stations,
wherein said mobile station establishes a communication line with N first base stations wherein N is an integer equal to or greater than one ($1 \leq N$), measures receipt quality in pilot signals transmitted from said N first base stations, determines M second base stations to make communication therethrough among said N first base stations, based on measurement results of said receipt quality, wherein M is an integer equal to or greater than one, but equal to or smaller than N($1 \leq M \leq N$), and transmits an designation signal to said M second base stations through upward line to designate said M second base stations as a base station through which said mobile station makes communication, and
each of said base stations makes communication with said mobile station, if designated by said designation signal as a base station through which said mobile station makes communication, and does not make communication with said mobile station, if not designated by said designation signal,
said cellular system further includes a first apparatus for varying conditions to determine said second base stations, in accordance with a target signal-signal-receipt error rate in downward line, to control said second base stations in number.

20. The cellular system as set forth in claim 19, further comprising a base station controller which controls said base stations making communication with said mobile station, and wherein said base station controller includes said first apparatus therein.

21. The cellular system as set forth in claim 19, further comprising a base station controller which controls said base stations making communication with said mobile station, and wherein said base station controller includes said first apparatus constituted as an apparatus which, when said mobile station designates a base station which transmits said pilot signal having receipt quality equal to or higher than a predetermined threshold, as said second base station, determines a higher threshold for a smaller target signal-signal-receipt error rate in said downward line.

22. The cellular system as set forth in claim 19, further comprising a base station controller which controls said base stations making communication with said mobile station, and wherein said base station controller includes said first apparatus constituted as an apparatus which determines a higher number of said second base stations for a smaller target signal-signal-receipt error rate in said downward line, when said mobile station designates a base station as said second base station by a predetermined number in the order of highness in said receipt quality of said pilot signal.

23. The cellular system as set forth in claim 19, further comprising a base station controller which controls said base stations making communication with said mobile station, and wherein said base station controller includes said first apparatus constituted as an apparatus which determines all of said base stations as said second base station, if said target signal-signal-receipt error rate in said downward line is equal to or smaller than a predetermined error rate.

24. The cellular system as set forth in claim 19, wherein said mobile station includes said first apparatus constituted as an apparatus which, when said mobile station designates a base station which transmits said pilot signal having receipt quality equal to or higher than a predetermined threshold, as said second base station, determines a higher threshold for a smaller target signal-signal-receipt error rate in said downward line.

25. The cellular system as set forth in claim 19, wherein said mobile station includes said first apparatus constituted as an apparatus which determines a higher number of said second base stations for a smaller target signal-signal-receipt error rate in said downward line, when said mobile station designates a base station as said second base station by a predetermined number in the order of highness in said receipt quality of said pilot signal.

26. The cellular system as set forth in claim 19, wherein said mobile station includes said first apparatus constituted as an apparatus which determines all of said base stations as said second base station, if said target signal-signal-receipt error rate in said downward line is equal to or smaller than a predetermined error rate.

27. A base station controller for controlling a mobile station and a base station in a cellular system,
wherein said mobile station establishes a communication line with N first base stations wherein N is an integer equal to or greater than one (1≦N), measures receipt quality in pilot signals transmitted from said N first base stations, determines M second base stations to make communication therethrough among said N first base stations, based on measurement results of said receipt quality, wherein M is an integer equal to or greater than one, but equal to or smaller than N(1≦M≦N), and transmits an designation signal to said M second base stations through upward line to designate said M second base stations as a base station through which said mobile station makes communication, and each of said base stations makes communication with said mobile station, if designated by said designation signal as a base station through which said mobile station makes communication, and does not make communication with said mobile station, if not designated by said destination signal, said base station controller includes a first apparatus for varying a signal-signal-receipt error rate in said designation signal to be transmitted through upward line in accordance with a target signal-signal-receipt error rate in downward line.

28. The base station controller as set forth in claim 27, wherein said first apparatus determines a transmission ratio for transmitting said designation signal, in accordance with said target signal-signal-receipt error rate in downward line, to control said signal-signal-receipt error rate in said designation signal in said base stations making communication with said mobile station.

29. The base station controller as set forth in claim 27, wherein said first apparatus is constituted as an apparatus which determines said target signal interference ratio in said upward line in said base stations in accordance with said target signal-signal-receipt error rate in said downward line, while a power at which said mobile station transmits a signal is controlled in a closed-loop such that receipt quality in said upward line reaches a target signal interference ratio.

30. The base station controller as set forth in claim 27, wherein said first apparatus is constituted as an apparatus which determines a higher target signal interference ratio in said upward line for a lower target signal-signal-receipt error rate in said downward line.

31. The base station controller as set forth in claim 27, wherein said first apparatus is constituted as an apparatus which determines a power at which said mobile station transmits said designation signal, in accordance with a target signal-signal-receipt error rate in said downward line.

32. The base station controller as set forth in claim 27, wherein said first apparatus is constituted as an apparatus which, when said mobile station transmits both a control signal to which said designation signal is multiplexed and an information signal to said base stations, determines a higher ratio of said control signal to said information signal with respect to a power at which said mobile station transmits said control and information signals, for a smaller target receipt rate in said downward line.

33. The base station controller as set forth in claim 27, wherein said first apparatus is constituted as an apparatus which determines a signal length of said designation signal in accordance with a target signal-signal-receipt error rate in said downward line.

34. The base station controller as set forth in claim 27, wherein said first apparatus is constituted as an apparatus which determines higher redundancy of said designation signal for a smaller target signal-signal-receipt error rate in said downward line, if said designation signal is encoded for correcting errors.

35. The base station controller as set forth in claim 27, wherein said first apparatus is constituted as an apparatus which determines a longer signal interval between said designation signal and a next designation signal for a smaller target signal-signal-receipt error rate in the downward line, when said designation signal is designed to have a fixed number in bits per a unit time.

36. The base station controller as set forth in claim 27, wherein said first apparatus is constituted as an apparatus which determines a higher number in bits per a unit time in said designation signal for a smaller target signal-signal-receipt error rate in the downward line, when said designation signal is designed to have a fixed transmission interval.

37. A base station controller for controlling a mobile station and a base station in a cellular system, wherein said mobile station establishes a communication line with N first base stations wherein N is an integer equal to or greater than one (1≦N), measures receipt quality in pilot signals transmitted from said N first base stations, determines M second base stations to make communication therethrough among said N first base stations, based on measurement results of said receipt quality, wherein M is an integer equal to or greater than one, but equal to or smaller than N(1≦M≦N), and transmits an designation signal to said M second base stations through upward line to designate said M second base stations as a base station through which said mobile station makes communication, and each of said base stations makes communication with said mobile station, if designated by said designation signal as a base station through which said mobile station makes communication, and does not make communication with said mobile station, if not designated by said designation signal, said base station controller further includes a tenth apparatus for varying conditions to determine said second base stations, in accordance with a target signal-signal-receipt error rate in downward line, to control said second base stations in number.

38. The base station controller as set forth in claim 37, wherein said first apparatus is constituted as an apparatus which, when said mobile station designates a base station which transmits said pilot signal having receipt quality equal to or higher than a predetermined threshold, as said second base station, determines a higher threshold for a smaller target signal-signal-receipt error rate in said downward line.

39. The base station controller as set forth in claim 37, wherein said first apparatus is constituted as an apparatus which determines a higher number of said second base stations for a smaller target signal-receipt error rate in said downward line, when said mobile station designates a base station as said second base station by a predetermined number in the order of highness in said receipt quality of said pilot signal.

40. The base station controller as set forth in claim 37, wherein said first apparatus is constituted as an apparatus which determines all of said base stations as said second base station, if said target signal-receipt error rate in said downward line is equal to or smaller than a predetermined error rate.

41. A mobile station which defines a cellular system together with a plurality of base stations, wherein said mobile station establishes a communication line with N first base stations wherein N is an integer equal to or greater than one (1≦N), measures receipt quality in pilot signals transmitted from said N first base stations, determines M second base stations to make communication therethrough among said N first base stations, based on measurement results of said receipt quality, wherein M is an integer equal to or greater than one, but equal to or smaller than N($1 \leq M \leq N$), and transmits an designation signal to said M second base stations through upward line to designate said M second base stations as a base station through which said mobile station makes communication, and said mobile station includes a first apparatus for varying a signal-receipt error rate in said designation signal to be transmitted through upward line in accordance with a target signal-receipt error rate in downward line.

42. The mobile station as set forth in claim 41, wherein said first apparatus is constituted as an apparatus which determines a power at which said mobile station transmits said designation signal, in accordance with a target signal-receipt error rate in said downward line.

43. The mobile station as set forth in claim 41, wherein said first apparatus is constituted as an apparatus which, when said mobile station transmits both a control signal to which said designation signal is multiplexed and an information signal to said base stations, determines a higher ratio of said control signal to said information signal with respect to a power at which said mobile station transmits said control and information signals, for a smaller target receipt rate in said downward line.

44. The mobile station as set forth in claim 41, wherein said first apparatus is constituted as an apparatus which determines a signal length of said designation signal in accordance with a target signal-receipt error rate in said downward line.

45. The mobile station as set forth in claim 41, wherein said first apparatus is constituted as an apparatus which determines higher redundancy of said designation signal for a smaller target signal-receipt error rate in said downward line, if said designation signal is encoded for correcting errors.

46. The mobile station as set forth in claim 41, wherein said first apparatus is constituted as an apparatus which determines a longer signal interval between said designation signal and a next designation signal for a smaller target signal-receipt error rate in the downward line, when said designation signal is designed to have a fixed number in bits per a unit time.

47. The mobile station as set forth in claim 41, wherein said first apparatus is constituted as an apparatus which determines a higher number in bits per a unit time in said designation signal for a smaller target signal-receipt error rate in the downward line, when said designation signal is designed to have a fixed transmission interval.

48. A mobile station which defines a cellular system together with a plurality of base stations, wherein said mobile station establishes a communication line with N first base stations wherein N is an integer equal to or greater than one ($1 \leq N$), measures receipt quality in pilot signals transmitted from said N first base stations, determines M second base stations to make communication therethrough among said N first base stations, based on measurement results of said receipt quality, wherein M is an integer equal to or greater than one, but equal to or smaller than N($1 \leq M \leq N$), and transmits an designation signal to said M second base stations through upward line to designate said M second base stations as a base station through which said mobile station makes communication, and said mobile station includes a first apparatus for varying conditions to determine said second base stations, in accordance with a target signal-receipt error rate in downward line, to control said second base stations in number.

49. The mobile station as set forth in claim 48, wherein said first apparatus is constituted as an apparatus which, when said mobile station designates a base station which transmits said pilot signal having receipt quality equal to or higher than a predetermined threshold, as said second base station, determines a higher threshold for a smaller target signal-receipt error rate in said downward line.

50. The mobile station as set forth in claim 48, wherein said first apparatus is constituted as an apparatus which determines a higher number of said second base stations for a smaller target signal-receipt error rate in said downward line, when said mobile station designates a base station as said second base station by a predetermined number in the order of highness in said receipt quality of said pilot signal.

51. The mobile station as set forth in claim 48, wherein said first apparatus is constituted as an apparatus which determines all of said base stations as said second base station, if said target signal-receipt error rate in said downward line is equal to or smaller than a predetermined error rate.

52. A method of controlling power at which a signal is transmitted in a cellular system comprising a mobile station and a plurality of base stations, comprising the steps of:

(a) establishing a communication line with N first base stations wherein N is an integer equal to or greater than one ($1 \leq N$);

(b) measuring receipt quality in pilot signals transmitted from said N first base stations;

(c) determining M second base stations to make communication therethrough among said N first base stations, based on measurement results of said receipt quality, wherein M is an integer equal to or greater than one, but equal to or smaller than N($1 \leq M \leq N$);

(d) transmitting an designation signal to said M second base stations through upward line to designate said M second base stations as a base station through which said mobile station makes communication;

(e) making communication with said mobile station, if designated by said designation signal as a base station through which said mobile station makes communication, and does not making communication with said mobile station, if not designated by said designation signal; and (f) varying a signal-receipt error rate in said designation signal to be transmitted through upward line in accordance with a target signal-receipt error rate in downward line, said steps (a), (b), (c) and (d) being to be carried out by said mobile station, said step (e) being to be carried out by said base station.

53. The method as set forth in claim 52, wherein said step (f) includes the step of determining a transmission ratio for transmitting said designation signal, in accordance with said target signal-receipt error rate in downward line, to control said signal-receipt error rate in said designation signal in said base stations making communication with said mobile station.

54. The method as set forth in claim 52, further comprising the step of determining said target signal interference ratio in said upward line in said base stations in accordance with said target signal-receipt error rate in said downward line, while a power at which said mobile station transmits a signal is controlled in a closed-loop such that receipt quality in said upward line reaches a target signal interference ratio.

55. The method as set forth in claim 52, further comprising the step of determining a higher target signal interference ratio in said upward line for a lower target signal-receipt error rate in said downward line.

56. The method as set forth in clam 52, further comprising the step of determining a power at which said mobile station transmits said designation signal, in accordance with a target signal-receipt error rate in said downward line.

57. The method as set forth in claim 52, further comprising the step of, when said mobile station transmits both a control signal to which said designation signal is multiplexed and an information signal to said base stations, determining a higher ratio of said control signal to said information signal with respect to a power at which said mobile station transmits said control and information signals, or a smaller target receipt rate in said downward line.

58. The method as set forth in claim 52, further comprising the step of determining a power at which said mobile station transmits said designation signal, in accordance with a target signal-receipt error rate in the downward line, said step being to be carried out by said mobile station.

59. The method as set forth in claim 52, further comprising the step of, when said mobile station transmits both a control signal to which said designation signal is multiplexed and an information signal to said base stations, determining a higher ratio of said information signal to said control signal with respect to a power at which said mobile station transmits said information and control signals, for a smaller target receipt rate in said downward line.

60. The method as set forth in claim 52, further comprising the step of determining a signal length of said designation signal in accordance with a target signal-receipt error rate in said downward line.

61. The method as set forth in claim 52, further comprising the step of determining higher redundancy of said designation signal for a smaller target signal-receipt error rate in said downward line, if said designation signal is encoded for correcting errors.

62. The method as set forth in claim 52, further comprising the step of determining a longer signal interval between said designation signal and a next designation signal for a smaller target signal-receipt error rate in the downward line, when said designation signal is designed to have a fixed number in bits per a unit time.

63. The method as set forth in claim 52, further comprising the step of determining a higher number in bits per a unit time in said designation signal for a smaller target signal-receipt error rate in the downward line, when said designation signal is designed to have a fixed transmission interval.

64. The method as set forth in claim 52, further comprising the step of determining a signal length of said designation signal in accordance with said target signal-receipt error rate in said downward line, said step being to be carried out by said mobile station.

65. The method as set forth in claim 52, further comprising the step of determining higher redundancy of said designation signal for a smaller target signal-receipt error rate in said downward line, if said designation signal is encoded for correcting errors, said step being to be carried out by said mobile station.

66. The method as set forth in claim 52, further comprising the step of determining a longer interval between said designation signals for a smaller target signal-receipt error rate in the downward line, when said designation signal is designed to have a fixed number of bits per a unit time, said step being to be carried out by said mobile station.

67. The method as set forth in claim 52, further comprising the step of determining a higher number in bits per a unit time in said designation signal for a smaller target signal-receipt error rate in the downward line, when said designation signal is designed to have a fixed transmission interval, said step being to be carried out by said mobile station.

68. A method of controlling power at which a signal is transmitted in a cellular system comprising a mobile station and a plurality of base stations, comprising the steps of:

(a) establishing a communication line with N first base stations wherein N is an integer equal to or greater than one ($1 \leq N$);

(b) measuring receipt quality in pilot signals transmitted from said N first base stations;

(c) determining M second base stations to make communication therethrough among said N first base stations, based on measurement results of said receipt quality, wherein M is an integer equal to or greater than one, but equal to or smaller than N($1 \leq M \leq N$);

(d) transmitting an designation signal to said M second base stations through upward line to designate said M second base stations as a base station through which said mobile station makes communication;

(e) making communication with said mobile station, if designated by said designation signal as a base station through which said mobile station makes communication, and does not making communication with said mobile station, if not designated by said designation signal; and (f) varying conditions to determine said second base stations, in accordance with a target signal-receipt error rate in downward line, to control said second base stations in number, said steps (a), (b), (c) and (d) being to be carried out by said mobile station, said step (e) being to be carried out by said base station.

69. The method as set forth in claim 68, further comprising the step of, when said mobile station designates a base station which transmits said pilot signal having receipt quality equal to or higher than a predetermined threshold, as said second base station, determining a higher threshold for a smaller target signal-receipt error rate in said downward line.

70. The method as set forth in claim 68, further comprising the step of determining a higher number of said second base stations for a smaller target signal-receipt error rate in said downward line, when said mobile station designates a base station as said second base station by a predetermined number in the order of highness in said receipt quality of said pilot signal.

71. The method as set forth in claim 68, further comprising the step of determining all of said base stations as said second base station, if said target signal-receipt error rate in said downward line is equal to or smaller than a predetermined error rate.

72. The method as set forth in claim 69, wherein said step of determining a higher threshold for a smaller target signal-receipt error rate in said downward line is carried out by said mobile station.

73. The method as set forth in claim 70, wherein said step of determining a higher number of said second base stations for a smaller target signal-receipt error rate in said downward line is carried out by said mobile station.

74. The method as set forth in claim 71, wherein said step of determining all of said base stations as said second base station is carried out by said mobile station.

* * * * *